US011381903B2

(12) United States Patent
Wilker et al.

(10) Patent No.: US 11,381,903 B2
(45) Date of Patent: *Jul. 5, 2022

(54) MODULAR QUICK-CONNECT A/V SYSTEM AND METHODS THEREOF

(71) Applicant: Sonic Blocks, Inc., Binghamton, NY (US)

(72) Inventors: Scott D. Wilker, Alexandria, VA (US); Jordan D. Wilker, Alexandria, VA (US)

(73) Assignee: Sonic Blocks Inc., Alexandria, VA (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/927,907

(22) Filed: Jul. 13, 2020

(65) Prior Publication Data

US 2020/0382860 A1  Dec. 3, 2020

Related U.S. Application Data

(60) Continuation of application No. 16/043,018, filed on Jul. 23, 2018, now Pat. No. 10,715,906, which is a
(Continued)

(51) Int. Cl.
*H04R 1/28* (2006.01)
*H04R 1/02* (2006.01)
(Continued)

(52) U.S. Cl.
CPC ............ *H04R 1/2803* (2013.01); *G10L 15/22* (2013.01); *H04R 1/02* (2013.01); *H04R 1/026* (2013.01);
(Continued)

(58) Field of Classification Search
CPC ........ H04R 1/2803; H04R 1/02; H04R 1/323; H04R 3/04; H04R 1/028; H04R 1/08;
(Continued)

(56) References Cited

U.S. PATENT DOCUMENTS 4,234,766 A  11/1980  Cacho
4,644,530 A   2/1987  Phiet
(Continued)

FOREIGN PATENT DOCUMENTS

CN  101640826 A  2/2010
EP    2557813 A2  2/2013
(Continued)

*Primary Examiner* — Tuan D Nguyen
(74) *Attorney, Agent, or Firm* — Hoffberg & Associates; Steven M. Hoffberg

(57) ABSTRACT

A modular speaker system, comprising an exoskeleton, configured to mechanically support and quick attach and release at least one functional panel and an electrical interface provided within the exoskeleton, configured to mate with a corresponding electrical connector of the functional panel. An optional endoskeleton is provided to support internal components. The system preferably provides a digital electronic controller, and the electrical interface is a digital data and power bus, with multiplexed communications between the elements of the system. The elements of the system preferably include at least one speaker, and other audiovisual and communications components. Multiple modules may be interconnected, communicating through the electrical interface. A base module may be provided to provide power and typical control, user and audiovisual interface connectors.

20 Claims, 5 Drawing Sheets

Related U.S. Application Data continuation of application No. 15/160,550, filed on May 20, 2016, now Pat. No. 10,034,079, which is a division of application No. 14/623,941, filed on Feb. 17, 2015, now Pat. No. 9,351,060.

(60) Provisional application No. 61/940,311, filed on Feb. 14, 2014.

(51) Int. Cl.

| | | |
|---|---|---|
| *H04R 1/32* | (2006.01) | |
| *H04R 3/04* | (2006.01) | |
| *G10L 15/22* | (2006.01) | |
| *H04R 1/08* | (2006.01) | |
| *H04R 1/40* | (2006.01) | |
| *H04R 27/00* | (2006.01) | |

(52) U.S. Cl.
CPC ............... *H04R 1/028* (2013.01); *H04R 1/08* (2013.01); *H04R 1/323* (2013.01); *H04R 3/04* (2013.01); *H04R 1/403* (2013.01); *H04R 27/00* (2013.01); *H04R 2201/028* (2013.01); *H04R 2227/003* (2013.01); *H04R 2420/07* (2013.01); *H04R 2420/09* (2013.01); *H04R 2499/15* (2013.01)

(58) Field of Classification Search
CPC ............... H04R 1/026; H04R 2201/028; H04R 2420/07; H04R 2420/09; H04R 2499/15; H04R 1/403; H04R 27/00; H04R 2227/003; G10L 15/22
See application file for complete search history.

(56) References Cited

U.S. PATENT DOCUMENTS

| | | |
|---|---|---|
| 4,875,143 A | 10/1989 | Fernandez |
| 5,000,286 A | 3/1991 | Crawford et al. |
| 5,094,316 A | 3/1992 | Rosen |
| 5,133,428 A | 7/1992 | Perrson |
| 5,239,687 A | 8/1993 | Chen |
| 5,592,559 A | 1/1997 | Takahashi et al. |
| 5,673,314 A | 9/1997 | Olkoski et al. |
| 5,774,628 A | 6/1998 | Hemphill |
| 5,936,302 A | 8/1999 | Pedersen et al. |
| 5,940,522 A | 8/1999 | Cahill et al. |
| 5,996,728 A | 12/1999 | Stark |
| 6,005,000 A | 12/1999 | Hopper et al. |
| 6,009,165 A | 12/1999 | Karnowski |
| 6,035,962 A | 3/2000 | Lin |
| 6,473,114 B1 | 10/2002 | Strubbe |
| 6,484,983 B1 | 11/2002 | Combest |
| 6,639,989 B1 | 10/2003 | Zacharov et al. |
| 6,675,931 B2 | 1/2004 | Sahyoun |
| 6,731,773 B1 | 5/2004 | Bergbower et al. |
| 6,760,456 B1 | 7/2004 | Annaratone |
| 6,823,244 B2 | 11/2004 | Breed |
| 6,850,252 B1 | 2/2005 | Hoffberg |
| 6,863,152 B1 | 3/2005 | Sahyoun |
| 6,910,548 B2 | 6/2005 | Powell |
| 6,925,188 B1 | 8/2005 | Markow et al. |
| 6,982,649 B2 | 1/2006 | Blum et al. |
| 7,120,269 B2 | 10/2006 | Lowell et al. |
| 7,201,251 B1 | 4/2007 | Baird |
| 7,269,255 B2 | 9/2007 | Satoh et al. |
| 7,272,237 B2 | 9/2007 | Linn et al. |
| 7,274,797 B2 | 9/2007 | Hungerford |
| 7,284,769 B2 | 10/2007 | Breed |
| 7,415,290 B2 | 8/2008 | Murray et al. |
| 7,454,334 B2 | 11/2008 | Agranat |
| 7,469,053 B2 | 12/2008 | Langberg |
| 7,471,804 B2 | 12/2008 | Lee |
| 7,475,990 B2 | 1/2009 | Ciccarelli et al. |
| 7,481,453 B2 | 1/2009 | Breed |
| 7,483,538 B2 | 1/2009 | McCarty et al. |
| 7,489,508 B2 | 2/2009 | Burout et al. |
| 7,511,630 B2 | 3/2009 | Strickland et al. |
| 7,539,532 B2 | 5/2009 | Tran |
| 7,539,533 B2 | 5/2009 | Tran |
| 7,558,622 B2 | 7/2009 | Tran |
| 7,567,680 B2 | 7/2009 | Murray et al. |
| 7,568,040 B2 | 7/2009 | Townsley et al. |
| 7,593,536 B2 | 9/2009 | Sung et al. |
| D601,546 S | 10/2009 | Lee et al. |
| 7,603,150 B2 | 10/2009 | Takahashi |
| 7,626,889 B2 | 12/2009 | Seltzer et al. |
| 7,629,896 B2 | 12/2009 | Blum et al. |
| 7,635,043 B2 | 12/2009 | Breed |
| 7,643,855 B2 | 1/2010 | Iwama et al. |
| 7,648,164 B2 | 1/2010 | Breed |
| 7,653,344 B1 | 1/2010 | Feldman et al. |
| 7,733,224 B2 | 6/2010 | Tran |
| 7,740,273 B2 | 6/2010 | Breed |
| 7,744,122 B2 | 6/2010 | Breed |
| D619,995 S | 7/2010 | Jha |
| 7,762,580 B2 | 7/2010 | Breed |
| 7,813,822 B1 | 10/2010 | Hoffberg |
| 7,831,756 B1 | 11/2010 | Fils |
| 7,832,762 B2 | 11/2010 | Breed |
| 7,840,022 B2 | 11/2010 | Matsumura et al. |
| 7,844,920 B2 | 11/2010 | Jha |
| 7,853,025 B2 | 12/2010 | Sleboda et al. |
| 7,853,708 B2 | 12/2010 | Townsley et al. |
| 7,856,256 B2 | 12/2010 | Yokota et al. |
| 7,929,446 B2 | 4/2011 | Bozarth et al. |
| 7,933,637 B2 | 4/2011 | Gammon et al. |
| 7,937,109 B2 | 5/2011 | Wilson |
| 7,961,900 B2 | 6/2011 | Zurek et al. |
| 7,970,350 B2 | 6/2011 | Sheynman et al. |
| 7,974,714 B2 | 7/2011 | Hoffberg |
| 7,986,804 B2 | 7/2011 | Linn et al. |
| 7,987,294 B2 | 7/2011 | Bryce et al. |
| D643,020 S | 8/2011 | Zhang |
| 8,054,987 B2 | 11/2011 | Seydoux |
| 8,059,801 B2 | 11/2011 | Bareis |
| 8,060,282 B2 | 11/2011 | Breed |
| 8,077,873 B2 | 12/2011 | Shridhar et al. |
| 8,085,920 B1 | 12/2011 | Bedingfield, Sr. et al. |
| D651,421 S | 1/2012 | Zotikov |
| 8,090,130 B2 | 1/2012 | Zorkendorfer et al. |
| 8,090,374 B2 | 1/2012 | Rezvani et al. |
| 8,098,856 B2 | 1/2012 | Hjort et al. |
| 8,098,868 B2 | 1/2012 | Kim et al. |
| 8,099,289 B2 | 1/2012 | Mozer et al. |
| 8,103,333 B2 | 1/2012 | Tran |
| 8,108,036 B2 | 1/2012 | Tran |
| 8,121,329 B2 | 2/2012 | Groset et al. |
| 8,121,673 B2 | 2/2012 | Tran |
| 8,126,159 B2 | 2/2012 | Goose et al. |
| 8,126,182 B2 | 2/2012 | Chang |
| 8,145,821 B2 | 3/2012 | Mead et al. |
| 8,147,414 B2 | 4/2012 | Abraham |
| 8,150,085 B2 | 4/2012 | Martikainen |
| 8,150,092 B2 | 4/2012 | Huang et al. |
| 8,155,370 B2 | 4/2012 | Hsu et al. |
| 8,165,333 B2 | 4/2012 | Tracy |
| 8,189,822 B2 | 5/2012 | Jakowski |
| 8,189,848 B2 | 5/2012 | Lim |
| 8,195,467 B2 | 6/2012 | Mozer et al. |
| 8,200,700 B2 | 6/2012 | Moore et al. |
| 8,204,260 B2 | 6/2012 | Suzuki |
| 8,224,794 B2 | 7/2012 | Rappaport |
| 8,244,106 B2 | 8/2012 | Kummer |
| 8,250,277 B2 | 8/2012 | Tseng et al. |
| 8,250,278 B2 | 8/2012 | Tseng et al. |
| 8,250,724 B2 | 8/2012 | Dabov et al. |
| 8,254,623 B2 | 8/2012 | Okumura |
| 8,255,059 B2 | 8/2012 | Lineaweaver et al. |
| 8,255,720 B1 | 8/2012 | Conway |
| 8,260,998 B2 | 9/2012 | Ganesh et al. |
| 8,260,999 B2 | 9/2012 | Ganesh et al. |
| 8,270,651 B2 | 9/2012 | McCarty et al. |

(56) References Cited

U.S. PATENT DOCUMENTS

| | | |
|---|---|---|
| 8,271,268 B2 | 9/2012 | Keohane et al. |
| 8,275,159 B2 | 9/2012 | Lee |
| 8,290,196 B2 | 10/2012 | Cheng et al. |
| 8,300,858 B2 | 10/2012 | Nakaya et al. |
| 8,301,452 B2 | 10/2012 | Simpson et al. |
| 8,311,254 B2 | 11/2012 | Lipsky et al. |
| 8,315,406 B2 | 11/2012 | Kon |
| 8,320,824 B2 | 11/2012 | Banks et al. |
| 8,321,227 B2 | 11/2012 | Charlier et al. |
| 8,323,188 B2 | 12/2012 | Tran |
| 8,323,189 B2 | 12/2012 | Tran et al. |
| 8,328,718 B2 | 12/2012 | Tran |
| 8,335,819 B2 | 12/2012 | Fu |
| 8,346,438 B2 | 1/2013 | Breed |
| 8,347,088 B2 | 1/2013 | Moore et al. |
| 8,351,638 B2 | 1/2013 | Park |
| 8,374,721 B2 | 2/2013 | Halloran et al. |
| 8,385,561 B2 | 2/2013 | Merrey et al. |
| 8,406,439 B1 | 3/2013 | Bedingfield, Sr. et al. |
| 8,425,415 B2 | 4/2013 | Tran |
| 8,437,493 B2 | 5/2013 | Nho et al. |
| 8,441,356 B1 | 5/2013 | Tedesco et al. |
| 8,449,471 B2 | 5/2013 | Tran |
| 8,461,988 B2 | 6/2013 | Tran |
| 8,467,133 B2 | 6/2013 | Miller |
| 8,468,426 B2 | 6/2013 | Bims |
| 8,472,120 B2 | 6/2013 | Border et al. |
| 8,475,368 B2 | 7/2013 | Tran et al. |
| 8,477,425 B2 | 7/2013 | Border et al. |
| 8,477,953 B2 | 7/2013 | Hobson et al. |
| 8,482,859 B2 | 7/2013 | Border et al. |
| 8,483,757 B2 | 7/2013 | Bodley et al. |
| 8,484,022 B1 | 7/2013 | Vanhoucke |
| 8,488,246 B2 | 7/2013 | Border et al. |
| 8,489,546 B2 | 7/2013 | Rappaport |
| 8,493,992 B2 | 7/2013 | Sella et al. |
| 8,494,507 B1 | 7/2013 | Tedesco et al. |
| 8,500,636 B2 | 8/2013 | Tran |
| 8,503,709 B2 | 8/2013 | Parker et al. |
| 8,515,925 B2 | 8/2013 | Rappaport |
| 8,525,673 B2 | 9/2013 | Tran |
| 8,525,687 B2 | 9/2013 | Tran |
| 8,531,291 B2 | 9/2013 | Tran |
| 8,537,543 B2 | 9/2013 | Wang et al. |
| 8,554,045 B2 | 10/2013 | Brooking et al. |
| 8,572,117 B2 | 10/2013 | Rappaport |
| 8,578,081 B1 | 11/2013 | Fils |
| 8,600,443 B2 | 12/2013 | Kawaguchi et al. |
| 8,606,383 B2 | 12/2013 | Jung et al. |
| 8,620,772 B2 | 12/2013 | Owen |
| 8,627,120 B2 | 1/2014 | Conway |
| 8,630,633 B1 | 1/2014 | Tedesco et al. |
| 8,640,183 B2 | 1/2014 | Reisman |
| 8,646,020 B2 | 2/2014 | Reisman |
| 8,652,038 B2 | 2/2014 | Tran et al. |
| 8,660,849 B2 | 2/2014 | Gruber et al. |
| 8,669,864 B1 | 3/2014 | Tedesco et al. |
| 8,670,554 B2 | 3/2014 | Mukund |
| 8,670,979 B2 | 3/2014 | Gruber et al. |
| 8,680,991 B2 | 3/2014 | Tran |
| 8,684,900 B2 | 4/2014 | Tran |
| 8,684,922 B2 | 4/2014 | Tran |
| 8,694,306 B1 | 4/2014 | Short et al. |
| 8,700,659 B2 | 4/2014 | Skeen et al. |
| 8,706,503 B2 | 4/2014 | Cheyer et al. |
| 8,708,903 B2 | 4/2014 | Tran |
| 8,725,700 B2 | 5/2014 | Rappaport |
| 8,727,978 B2 | 5/2014 | Tran et al. |
| 8,731,942 B2 | 5/2014 | Cheyer et al. |
| 8,732,193 B2 | 5/2014 | Skeen et al. |
| 8,732,195 B2 | 5/2014 | Skeen et al. |
| 8,744,087 B2 | 6/2014 | Bodley et al. |
| 8,744,495 B2 | 6/2014 | Ho et al. |
| 8,747,313 B2 | 6/2014 | Tran et al. |
| 8,747,336 B2 | 6/2014 | Tran |
| 8,761,931 B2 | 6/2014 | Halloran et al. |
| 8,762,852 B2 | 6/2014 | Davis et al. |
| 8,764,651 B2 | 7/2014 | Tran |
| 8,768,573 B2 | 7/2014 | Breed |
| 8,781,442 B1 | 7/2014 | Link, II |
| 8,799,000 B2 | 8/2014 | Guzzoni et al. |
| 8,810,392 B1 | 8/2014 | Teller et al. |
| 8,812,122 B2 | 8/2014 | Lineaweaver et al. |
| 8,819,172 B2 | 8/2014 | Davis et al. |
| 8,831,279 B2 | 9/2014 | Rodriguez et al. |
| 8,838,184 B2 | 9/2014 | Burnett et al. |
| 8,839,342 B2 | 9/2014 | Banks et al. |
| 8,848,970 B2 | 9/2014 | Aller et al. |
| 8,855,349 B2 | 10/2014 | Yeh et al. |
| 8,856,170 B2 | 10/2014 | Skeen et al. |
| 8,862,616 B2 | 10/2014 | Skeen et al. |
| 8,873,239 B2 | 10/2014 | McRae et al. |
| 8,892,446 B2 | 11/2014 | Cheyer et al. |
| 8,898,722 B2 | 11/2014 | Reisman |
| 8,903,716 B2 | 12/2014 | Chen et al. |
| 8,904,016 B2 | 12/2014 | Fu |
| 8,909,474 B2 | 12/2014 | McSchooler |
| 8,914,652 B1 | 12/2014 | Conway |
| 8,914,840 B2 | 12/2014 | Reisman |
| 8,918,197 B2 | 12/2014 | Suhami |
| 8,930,191 B2 | 1/2015 | Gruber et al. |
| 8,935,279 B2 | 1/2015 | Skeen et al. |
| 8,935,580 B2 | 1/2015 | Bims |
| 8,942,986 B2 | 1/2015 | Cheyer et al. |
| 8,964,298 B2 | 2/2015 | Haddick et al. |
| 8,968,195 B2 | 3/2015 | Tran |
| 8,983,844 B1 | 3/2015 | Thomas et al. |
| 9,008,353 B2 | 4/2015 | Aller |
| 9,022,417 B2 | 5/2015 | Breed |
| 9,026,609 B2 | 5/2015 | Oliver et al. |
| 9,028,405 B2 | 5/2015 | Tran |
| 9,031,838 B1 | 5/2015 | Nash et al. |
| 9,043,093 B2 | 5/2015 | Breed |
| 9,053,562 B1 | 6/2015 | Rabin et al. |
| 9,060,683 B2 | 6/2015 | Tran |
| 9,077,948 B2 | 7/2015 | Kummer |
| 9,087,520 B1 | 7/2015 | Salvador |
| 9,088,906 B2 | 7/2015 | Sella et al. |
| 9,097,890 B2 | 8/2015 | Miller et al. |
| 9,097,891 B2 | 8/2015 | Border et al. |
| 9,105,083 B2 | 8/2015 | Rhoads et al. |
| 9,107,586 B2 | 8/2015 | Tran |
| 9,112,700 B2 | 8/2015 | Link, II |
| 9,117,447 B2 | 8/2015 | Gruber et al. |
| 9,118,488 B2 | 8/2015 | Donaldson |
| 9,119,000 B2 | 8/2015 | Tracy |
| 9,128,281 B2 | 9/2015 | Osterhout et al. |
| 9,129,295 B2 | 9/2015 | Border et al. |
| 9,134,534 B2 | 9/2015 | Border et al. |
| 9,135,912 B1 | 9/2015 | Strope et al. |
| 9,154,730 B2 | 10/2015 | Lee et al. |
| 9,175,967 B2 | 11/2015 | Abramson et al. |
| 9,179,232 B2 | 11/2015 | Jarske et al. |
| 9,182,596 B2 | 11/2015 | Border et al. |
| 9,183,580 B2 | 11/2015 | Rhoads et al. |
| 9,191,493 B2 | 11/2015 | Adams |
| 9,197,736 B2 | 11/2015 | Davis et al. |
| 9,202,254 B2 | 12/2015 | Rodriguez et al. |
| 9,202,360 B1 | 12/2015 | Tedesco et al. |
| 9,204,796 B2 | 12/2015 | Tran |
| 9,215,980 B2 | 12/2015 | Tran et al. |
| 9,218,413 B2 | 12/2015 | Skeen et al. |
| 9,218,530 B2 | 12/2015 | Davis et al. |
| 9,223,134 B2 | 12/2015 | Miller et al. |
| 9,225,822 B2 | 12/2015 | Davis et al. |
| 9,229,227 B2 | 1/2016 | Border et al. |
| 9,240,021 B2 | 1/2016 | Rodriguez |
| 9,241,044 B2 | 1/2016 | Shribman et al. |
| 9,251,806 B2 | 2/2016 | Shah et al. |
| 9,253,572 B2 | 2/2016 | Bedingfield, Sr. et al. |
| 9,258,646 B2 | 2/2016 | Hillman et al. |
| 9,282,286 B2 | 3/2016 | Chauhan |
| 9,285,589 B2 | 3/2016 | Osterhout et al. |
| 9,286,783 B1 | 3/2016 | Teller et al. |

(56) References Cited

U.S. PATENT DOCUMENTS

| | | |
|---|---|---|
| 9,286,897 B2 | 3/2016 | Bisani et al. |
| 9,292,895 B2 | 3/2016 | Rodriguez et al. |
| 9,299,347 B1 | 3/2016 | Siohan et al. |
| 9,301,057 B2 | 3/2016 | Sprague et al. |
| 9,305,317 B2 | 4/2016 | Grokop et al. |
| 9,318,108 B2 | 4/2016 | Gruber et al. |
| 9,319,792 B1 | 4/2016 | Coleman et al. |
| 9,323,303 B2 | 4/2016 | Ho et al. |
| 9,324,322 B1 | 4/2016 | Torok et al. |
| 9,325,781 B2 | 4/2016 | Jung et al. |
| 9,330,427 B2 | 5/2016 | Conwell |
| 9,341,843 B2 | 5/2016 | Border et al. |
| 9,342,829 B2 | 5/2016 | Zhou et al. |
| 9,349,108 B2 | 5/2016 | Skeen et al. |
| 9,351,060 B2 | 5/2016 | Wilker et al. |
| 9,351,640 B2 | 5/2016 | Tran |
| 9,354,778 B2 | 5/2016 | Cornaby et al. |
| 9,366,862 B2 | 6/2016 | Haddick et al. |
| 9,367,886 B2 | 6/2016 | Davis et al. |
| 9,373,342 B2 | 6/2016 | Pilli et al. |
| 9,380,374 B2 | 6/2016 | Sprague et al. |
| 9,387,394 B1 | 7/2016 | Johnson et al. |
| 9,390,724 B2 | 7/2016 | List |
| 9,392,920 B2 | 7/2016 | Halloran et al. |
| 9,401,058 B2 | 7/2016 | De La Fuente et al. |
| 9,401,146 B2 | 7/2016 | Sharifi |
| 9,412,361 B1 | 8/2016 | Geramifard et al. |
| 9,414,780 B2 | 8/2016 | Rhoads |
| 9,418,658 B1 * | 8/2016 | David ..................... H04M 1/64 |
| 9,424,618 B2 | 8/2016 | Rodriguez |
| 9,443,516 B2 | 9/2016 | Katuri et al. |
| 9,443,535 B2 | 9/2016 | Short et al. |
| 9,445,763 B2 | 9/2016 | Davis et al. |
| 9,449,602 B2 | 9/2016 | Ooi et al. |
| 9,451,202 B2 | 9/2016 | Beals |
| 9,472,203 B1 | 10/2016 | Ayrapetian et al. |
| 9,484,046 B2 | 11/2016 | Knudson et al. |
| 9,495,975 B2 | 11/2016 | Short et al. |
| 9,503,569 B1 | 11/2016 | Adams |
| 9,504,420 B2 | 11/2016 | Davis et al. |
| 9,516,410 B1 | 12/2016 | Ayrapetian et al. |
| 9,542,956 B1 | 1/2017 | Nostrant |
| 9,543,920 B2 | 1/2017 | Dicks et al. |
| 9,547,873 B2 | 1/2017 | Rhoads |
| 9,548,050 B2 | 1/2017 | Gruber et al. |
| 9,548,053 B1 | 1/2017 | Basye et al. |
| 9,554,210 B1 | 1/2017 | Ayrapetian et al. |
| 9,558,758 B1 | 1/2017 | Piersol et al. |
| 9,569,173 B1 | 2/2017 | Coleman et al. |
| 9,569,405 B2 | 2/2017 | Sharifi et al. |
| 9,572,103 B2 | 2/2017 | Tang et al. |
| 9,574,762 B1 | 2/2017 | Grillo et al. |
| 9,584,899 B1 | 2/2017 | Klimanis et al. |
| 9,589,575 B1 | 3/2017 | Ayrapetian et al. |
| 9,599,990 B2 | 3/2017 | Halloran et al. |
| 9,607,626 B1 | 3/2017 | Yang et al. |
| 9,612,311 B2 | 4/2017 | Jarske et al. |
| 9,620,107 B2 | 4/2017 | Lambdin et al. |
| 9,628,286 B1 | 4/2017 | Nguyen et al. |
| 9,628,596 B1 | 4/2017 | Bullough et al. |
| 9,632,748 B2 | 4/2017 | Faaborg |
| 9,633,659 B1 | 4/2017 | Agrawal et al. |
| 9,633,661 B1 | 4/2017 | Typrin et al. |
| 9,638,537 B2 | 5/2017 | Abramson et al. |
| 9,640,028 B2 | 5/2017 | Ovalle |
| 9,640,179 B1 | 5/2017 | Hart et al. |
| 9,641,919 B1 | 5/2017 | Poole et al. |
| 9,648,197 B2 | 5/2017 | Aller |
| 9,653,060 B1 | 5/2017 | Hilmes et al. |
| 9,659,460 B2 | 5/2017 | Ovalle |
| 9,659,555 B1 | 5/2017 | Hilmes et al. |
| 9,661,438 B1 | 5/2017 | Yang et al. |
| 9,693,099 B2 | 6/2017 | Kummer |
| 9,731,668 B2 | 8/2017 | Gusikhin et al. |
| 9,734,463 B2 | 8/2017 | Skeen et al. |
| 9,734,659 B2 | 8/2017 | Ovalle |
| 9,742,866 B2 | 8/2017 | Shribman et al. |
| 9,747,656 B2 | 8/2017 | Stach et al. |
| 9,747,920 B2 | 8/2017 | Ayrapetian et al. |
| 9,754,604 B2 | 9/2017 | Wolff et al. |
| 9,754,605 B1 | 9/2017 | Chhetri |
| 9,759,917 B2 | 9/2017 | Osterhout et al. |
| 9,769,420 B1 | 9/2017 | Moses |
| 9,772,196 B2 | 9/2017 | Abramson et al. |
| 9,772,815 B1 | 9/2017 | Medina |
| 9,775,520 B2 | 10/2017 | Tran |
| 9,781,106 B1 | 10/2017 | Vitus et al. |
| 9,785,741 B2 | 10/2017 | Lenchner et al. |
| 9,794,679 B2 | 10/2017 | Wilker et al. |
| 9,799,329 B1 | 10/2017 | Pogue et al. |
| 9,799,330 B2 | 10/2017 | Nemala et al. |
| 9,801,542 B2 | 10/2017 | Tran et al. |
| 9,812,146 B1 | 11/2017 | Gejji et al. |
| 9,814,425 B2 | 11/2017 | Tran |
| 9,817,958 B1 | 11/2017 | McCorkendale |
| 9,818,407 B1 | 11/2017 | Secker-Walker et al. |
| 9,818,425 B1 | 11/2017 | Ayrapetian et al. |
| 9,820,049 B1 | 11/2017 | Ayrapetian et al. |
| 9,820,657 B2 | 11/2017 | Tran |
| 9,820,658 B2 | 11/2017 | Tran |
| 9,826,599 B2 | 11/2017 | Banta |
| 9,830,924 B1 | 11/2017 | Degges, Jr. et al. |
| 9,830,950 B2 | 11/2017 | Rodriguez et al. |
| 9,832,569 B1 | 11/2017 | Ayrapetian et al. |
| 9,833,707 B2 | 12/2017 | Watson |
| 9,837,083 B1 | 12/2017 | List |
| 9,839,267 B1 | 12/2017 | Gharabegian |
| 9,848,260 B2 | 12/2017 | Conliffe |
| 9,858,925 B2 | 1/2018 | Gruber et al. |
| 9,864,576 B1 | 1/2018 | Liu et al. |
| 9,865,176 B2 | 1/2018 | Tran |
| 9,865,248 B2 | 1/2018 | Fleizach et al. |
| 9,865,259 B1 | 1/2018 | Typrin et al. |
| 9,866,308 B1 | 1/2018 | Bultan et al. |
| 9,870,535 B2 | 1/2018 | Chowdhary et al. |
| 9,871,808 B2 | 1/2018 | Tang et al. |
| 9,883,847 B2 | 2/2018 | Wolf et al. |
| 9,900,685 B2 | 2/2018 | Varerkar et al. |
| 9,901,236 B2 | 2/2018 | Halloran et al. |
| 9,901,252 B2 | 2/2018 | Tran |
| 9,907,473 B2 | 3/2018 | Tran |
| 9,918,163 B1 | 3/2018 | Rapetian et al. |
| 9,922,646 B1 | 3/2018 | Blanksteen |
| 9,947,333 B1 | 4/2018 | David |
| 9,947,364 B2 | 4/2018 | Kanevsky et al. |
| 9,950,259 B2 | 4/2018 | Watson |
| 9,951,541 B1 | 4/2018 | Gharabegian |
| 9,953,660 B2 | 4/2018 | Tang et al. |
| 9,966,059 B1 | 5/2018 | Ayrapetian et al. |
| 9,967,661 B1 | 5/2018 | Hilmes et al. |
| 9,972,318 B1 | 5/2018 | Kelly et al. |
| 9,972,339 B1 | 5/2018 | Sundaram |
| 9,973,561 B2 | 5/2018 | Fu et al. |
| 9,973,627 B1 | 5/2018 | Allison |
| 9,973,633 B2 | 5/2018 | Schroeter et al. |
| 9,973,849 B1 | 5/2018 | Zhang et al. |
| 9,979,724 B2 | 5/2018 | Tunnell et al. |
| 9,979,769 B2 | 5/2018 | Pilli et al. |
| 9,986,419 B2 | 5/2018 | Naik et al. |
| 9,993,166 B1 | 6/2018 | Johnson et al. |
| 9,997,151 B1 | 6/2018 | Ayrapetian et al. |
| 2002/0121403 A1 | 9/2002 | Sahyoun |
| 2003/0053648 A1 | 3/2003 | Jorgensen et al. |
| 2003/0068049 A1 | 4/2003 | Lowell et al. |
| 2003/0144034 A1 | 7/2003 | Hack et al. |
| 2003/0155753 A1 | 8/2003 | Breed |
| 2003/0176959 A1 | 9/2003 | Breed |
| 2003/0213642 A1 | 11/2003 | Powell |
| 2004/0001002 A1 | 1/2004 | Blum et al. |
| 2004/0036261 A1 | 2/2004 | Breed |
| 2004/0120619 A1 | 6/2004 | Chai |
| 2004/0240700 A1 | 12/2004 | Linn et al. |
| 2005/0025326 A1 | 2/2005 | Hussaini et al. |
| 2005/0047616 A1 | 3/2005 | Lee |

(56) References Cited

U.S. PATENT DOCUMENTS

| | | |
|---|---|---|
| 2005/0047617 A1 | 3/2005 | Lee |
| 2005/0049876 A1 | 3/2005 | Agranat |
| 2005/0049877 A1 | 3/2005 | Agranat |
| 2005/0185801 A1 | 8/2005 | McCarty et al. |
| 2005/0186992 A1 | 8/2005 | Skret et al. |
| 2005/0197747 A1 | 9/2005 | Rappaport et al. |
| 2005/0255895 A1 | 11/2005 | Lee et al. |
| 2005/0280555 A1 | 12/2005 | Warner |
| 2006/0013416 A1 | 1/2006 | Truong et al. |
| 2006/0217162 A1 | 9/2006 | Bodley et al. |
| 2006/0232052 A1 | 10/2006 | Breed |
| 2007/0007331 A1 | 1/2007 | Jasper et al. |
| 2007/0040026 A1 | 2/2007 | Vleet et al. |
| 2007/0061266 A1 | 3/2007 | Moore et al. |
| 2007/0061487 A1 | 3/2007 | Moore et al. |
| 2007/0135185 A1 | 6/2007 | Dvorak et al. |
| 2007/0147644 A1 | 6/2007 | Bodley et al. |
| 2007/0149246 A1 | 6/2007 | Bodley et al. |
| 2007/0154041 A1 | 7/2007 | Beauchamp |
| 2007/0160225 A1 | 7/2007 | Seydoux |
| 2007/0165895 A1 | 7/2007 | Matsumura et al. |
| 2007/0167187 A1 | 7/2007 | Rezvani et al. |
| 2007/0189497 A1 | 8/2007 | Bareis |
| 2007/0189554 A1 | 8/2007 | Innis et al. |
| 2007/0203990 A1 | 8/2007 | Townsley et al. |
| 2007/0203999 A1 | 8/2007 | Townsley et al. |
| 2007/0206827 A1 | 9/2007 | Fupman et al. |
| 2007/0213016 A1 | 9/2007 | Hoffman |
| 2007/0228703 A1 | 10/2007 | Breed |
| 2007/0230723 A1 | 10/2007 | Hobson et al. |
| 2007/0237337 A1 | 10/2007 | Mah |
| 2007/0250212 A1 | 10/2007 | Halloran et al. |
| 2007/0265533 A1 | 11/2007 | Tran |
| 2007/0273504 A1 | 11/2007 | Tran |
| 2007/0276270 A1 | 11/2007 | Tran |
| 2008/0001735 A1 | 1/2008 | Tran |
| 2008/0004904 A1 | 1/2008 | Tran |
| 2008/0013779 A1 | 1/2008 | Linn et al. |
| 2008/0021706 A1 | 1/2008 | Bruwer |
| 2008/0024686 A1 | 1/2008 | Vafladis |
| 2008/0031441 A1 | 2/2008 | Braho et al. |
| 2008/0031483 A1 | 2/2008 | Hill |
| 2008/0045140 A1 | 2/2008 | Korhonen |
| 2008/0048880 A1 | 2/2008 | Strickland et al. |
| 2008/0055105 A1 | 3/2008 | Blum et al. |
| 2008/0062251 A1 | 3/2008 | Yuki |
| 2008/0067792 A1 | 3/2008 | Breed |
| 2008/0075065 A1 | 3/2008 | Reuss et al. |
| 2008/0082237 A1 | 4/2008 | Breed |
| 2008/0089513 A1 | 4/2008 | Kotzin et al. |
| 2008/0101638 A1 | 5/2008 | Ziller |
| 2008/0147280 A1 | 6/2008 | Breed |
| 2008/0152164 A1 | 6/2008 | Laude et al. |
| 2008/0168312 A1 | 7/2008 | Banks et al. |
| 2008/0192736 A1 | 8/2008 | Jabri et al. |
| 2008/0212971 A1 | 9/2008 | Shaanan et al. |
| 2008/0214238 A1 | 9/2008 | Rokusek et al. |
| 2008/0230497 A1 | 9/2008 | Strickland et al. |
| 2008/0243342 A1 | 10/2008 | Breed |
| 2008/0252595 A1 | 10/2008 | Boillot |
| 2008/0262845 A1 | 10/2008 | Keohane et al. |
| 2008/0267429 A1 | 10/2008 | Tracy |
| 2008/0272580 A1 | 11/2008 | Breed |
| 2008/0277911 A1 | 11/2008 | Breed |
| 2008/0284145 A1 | 11/2008 | Breed |
| 2008/0304692 A1 | 12/2008 | Zhang |
| 2009/0029745 A1 | 1/2009 | Eaton |
| 2009/0067640 A1 | 3/2009 | McCarty et al. |
| 2009/0070379 A1 | 3/2009 | Rappaport |
| 2009/0079705 A1 | 3/2009 | Sizelove et al. |
| 2009/0079883 A1 | 3/2009 | Banks et al. |
| 2009/0081948 A1 | 3/2009 | Banks et al. |
| 2009/0087002 A1 | 4/2009 | Nakaya et al. |
| 2009/0105597 A1 | 4/2009 | Abraham |
| 2009/0110216 A1 | 4/2009 | Tschirpke |
| 2009/0111378 A1 | 4/2009 | Sheynman et al. |
| 2009/0175216 A1 | 7/2009 | Bozarth et al. |
| 2009/0191911 A1 | 7/2009 | Wilson |
| 2009/0204409 A1 | 8/2009 | Mozer et al. |
| 2009/0204410 A1 | 8/2009 | Mozer et al. |
| 2009/0227876 A1 | 9/2009 | Tran |
| 2009/0227877 A1 | 9/2009 | Tran |
| 2009/0238384 A1 | 9/2009 | Beauchamp |
| 2009/0296964 A1 | 12/2009 | Bienek et al. |
| 2009/0306741 A1 | 12/2009 | Hogle et al. |
| 2009/0312817 A1 | 12/2009 | Hogle et al. |
| 2009/0316920 A1 | 12/2009 | Matsumura et al. |
| 2009/0318779 A1 | 12/2009 | Tran |
| 2010/0002692 A1 | 1/2010 | Bims |
| 2010/0020999 A1 | 1/2010 | Huang et al. |
| 2010/0030563 A1 | 2/2010 | Uhle et al. |
| 2010/0036717 A1 | 2/2010 | Trest |
| 2010/0037072 A1 | 2/2010 | Nejah |
| 2010/0042413 A1 | 2/2010 | Simpson et al. |
| 2010/0062713 A1 | 3/2010 | Blarney et al. |
| 2010/0119078 A1 | 5/2010 | Curtis et al. |
| 2010/0158477 A1 | 6/2010 | Kummer |
| 2010/0169073 A1 | 7/2010 | Almagro |
| 2010/0177909 A1* | 7/2010 | Aarts .................... H04R 1/403 381/92 |
| 2010/0178959 A1 | 7/2010 | Fish |
| 2010/0250268 A1 | 9/2010 | Rappaport |
| 2010/0250269 A1 | 9/2010 | Rappaport |
| 2010/0290635 A1 | 11/2010 | Shridhar et al. |
| 2010/0299274 A1 | 11/2010 | Rappaport |
| 2010/0322445 A1 | 12/2010 | Jakowski |
| 2010/0333163 A1 | 12/2010 | Daly |
| 2011/0077802 A1 | 3/2011 | Halloran et al. |
| 2011/0093273 A1 | 4/2011 | Lee et al. |
| 2011/0096036 A1 | 4/2011 | McIntosh et al. |
| 2011/0098087 A1 | 4/2011 | Tseng |
| 2011/0099316 A1 | 4/2011 | Tseng et al. |
| 2011/0099392 A1 | 4/2011 | Conway |
| 2011/0112664 A1 | 5/2011 | Ong |
| 2011/0115624 A1 | 5/2011 | Tran |
| 2011/0123054 A1 | 5/2011 | Adamson et al. |
| 2011/0131358 A1 | 6/2011 | Ganesh et al. |
| 2011/0158424 A1 | 6/2011 | Hillman et al. |
| 2011/0161076 A1 | 6/2011 | Davis et al. |
| 2011/0161403 A1 | 6/2011 | Fu |
| 2011/0165890 A1 | 7/2011 | Ho et al. |
| 2011/0181422 A1 | 7/2011 | Tran |
| 2011/0184736 A1 | 7/2011 | Slotznick |
| 2011/0188391 A1 | 8/2011 | Sella et al. |
| 2011/0219127 A1 | 9/2011 | Fu |
| 2011/0222720 A1 | 9/2011 | Cheng et al. |
| 2011/0274286 A2 | 11/2011 | McCarty et al. |
| 2011/0276330 A1 | 11/2011 | Charlier et al. |
| 2011/0282968 A1 | 11/2011 | Oliver et al. |
| 2011/0314530 A1 | 12/2011 | Donaldson |
| 2011/0320202 A1 | 12/2011 | Kaufman |
| 2012/0002356 A1 | 1/2012 | Linnane et al. |
| 2012/0014534 A1 | 1/2012 | Bodley et al. |
| 2012/0021778 A1 | 1/2012 | Ho et al. |
| 2012/0021808 A1 | 1/2012 | Tseng |
| 2012/0022872 A1 | 1/2012 | Gruber et al. |
| 2012/0023463 A1 | 1/2012 | Tseng et al. |
| 2012/0030393 A1 | 2/2012 | Ganesh et al. |
| 2012/0058727 A1 | 3/2012 | Cook et al. |
| 2012/0075168 A1 | 3/2012 | Osterhout et al. |
| 2012/0092156 A1 | 4/2012 | Tran |
| 2012/0092157 A1 | 4/2012 | Tran |
| 2012/0095352 A1 | 4/2012 | Tran |
| 2012/0095357 A1 | 4/2012 | Tran |
| 2012/0114151 A1 | 5/2012 | Nguyen et al. |
| 2012/0116559 A1 | 5/2012 | Davis et al. |
| 2012/0134548 A1 | 5/2012 | Rhoads et al. |
| 2012/0143608 A1 | 6/2012 | Kaufman |
| 2012/0154633 A1 | 6/2012 | Rodriguez |
| 2012/0183158 A1 | 7/2012 | Tracy |
| 2012/0194418 A1 | 8/2012 | Osterhout et al. |
| 2012/0194419 A1 | 8/2012 | Osterhout et al. |
| 2012/0194420 A1 | 8/2012 | Osterhout et al. |
| 2012/0194549 A1 | 8/2012 | Osterhout et al. |

(56) References Cited

U.S. PATENT DOCUMENTS

| | | |
|---|---|---|
| 2012/0194550 A1 | 8/2012 | Osterhout et al. |
| 2012/0194551 A1 | 8/2012 | Osterhout et al. |
| 2012/0194552 A1 | 8/2012 | Osterhout et al. |
| 2012/0194553 A1 | 8/2012 | Osterhout et al. |
| 2012/0200488 A1 | 8/2012 | Osterhout et al. |
| 2012/0200499 A1 | 8/2012 | Osterhout et al. |
| 2012/0200601 A1 | 8/2012 | Osterhout et al. |
| 2012/0204213 A1 | 8/2012 | Lau |
| 2012/0206322 A1 | 8/2012 | Osterhout et al. |
| 2012/0206323 A1 | 8/2012 | Osterhout et al. |
| 2012/0206334 A1 | 8/2012 | Osterhout et al. |
| 2012/0206335 A1 | 8/2012 | Osterhout et al. |
| 2012/0206485 A1 | 8/2012 | Osterhout et al. |
| 2012/0208592 A1 | 8/2012 | Davis et al. |
| 2012/0210233 A1 | 8/2012 | Davis et al. |
| 2012/0212398 A1 | 8/2012 | Border et al. |
| 2012/0212399 A1 | 8/2012 | Border et al. |
| 2012/0212400 A1 | 8/2012 | Border et al. |
| 2012/0212406 A1 | 8/2012 | Osterhout et al. |
| 2012/0212414 A1 | 8/2012 | Osterhout et al. |
| 2012/0212484 A1 | 8/2012 | Haddick et al. |
| 2012/0212499 A1 | 8/2012 | Haddick et al. |
| 2012/0218172 A1 | 8/2012 | Border et al. |
| 2012/0218301 A1 | 8/2012 | Miller |
| 2012/0224743 A1 | 9/2012 | Rodriguez et al. |
| 2012/0235883 A1 | 9/2012 | Border et al. |
| 2012/0235884 A1 | 9/2012 | Miller et al. |
| 2012/0235885 A1 | 9/2012 | Miller et al. |
| 2012/0235886 A1 | 9/2012 | Border et al. |
| 2012/0235887 A1 | 9/2012 | Border et al. |
| 2012/0235900 A1 | 9/2012 | Border et al. |
| 2012/0236030 A1 | 9/2012 | Border et al. |
| 2012/0236031 A1 | 9/2012 | Haddick et al. |
| 2012/0242501 A1 | 9/2012 | Tran et al. |
| 2012/0242678 A1 | 9/2012 | Border et al. |
| 2012/0242697 A1 | 9/2012 | Border et al. |
| 2012/0242698 A1 | 9/2012 | Haddick et al. |
| 2012/0243718 A1 | 9/2012 | Hsu Huang et al. |
| 2012/0244835 A1 | 9/2012 | Rappaport |
| 2012/0245464 A1 | 9/2012 | Tran |
| 2012/0246142 A1 | 9/2012 | Rappaport |
| 2012/0249797 A1 | 10/2012 | Haddick et al. |
| 2012/0250924 A1 | 10/2012 | Nicholson et al. |
| 2012/0265528 A1 | 10/2012 | Gruber et al. |
| 2012/0269332 A1 | 10/2012 | Mukund |
| 2012/0275642 A1 | 11/2012 | Aller et al. |
| 2012/0277893 A1 | 11/2012 | Davis et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0288079 A1 | 11/2012 | Burnett et al. |
| 2012/0302220 A1 | 11/2012 | Kummer |
| 2012/0303851 A1 | 11/2012 | Tseng et al. |
| 2012/0323938 A1 | 12/2012 | Skeen et al. |
| 2012/0329441 A1 | 12/2012 | Tseng |
| 2012/0330109 A1 | 12/2012 | Tran |
| 2013/0009783 A1 | 1/2013 | Tran |
| 2013/0028443 A1 | 1/2013 | Pance et al. |
| 2013/0028457 A1 | 1/2013 | Yeh et al. |
| 2013/0029684 A1 | 1/2013 | Kawaguchi et al. |
| 2013/0035827 A1 | 2/2013 | Breed |
| 2013/0039527 A1 | 2/2013 | Jensen et al. |
| 2013/0058022 A1 | 3/2013 | Knutson et al. |
| 2013/0060885 A1 | 3/2013 | Fu |
| 2013/0069780 A1 | 3/2013 | Tran et al. |
| 2013/0072807 A1 | 3/2013 | Tran |
| 2013/0073300 A1 | 3/2013 | Wolf et al. |
| 2013/0074129 A1 | 3/2013 | Reisman |
| 2013/0089217 A1 | 4/2013 | Kelloniemi et al. |
| 2013/0095459 A1 | 4/2013 | Tran |
| 2013/0104251 A1 | 4/2013 | Moore et al. |
| 2013/0127980 A1 | 5/2013 | Haddick et al. |
| 2013/0150114 A1 | 6/2013 | Bodley et al. |
| 2013/0168954 A1 | 7/2013 | Koren et al. |
| 2013/0169838 A1 | 7/2013 | Rodriguez et al. |
| 2013/0170678 A1 | 7/2013 | Beddingfield, Sr. et al. |
| 2013/0170684 A1 | 7/2013 | Nicholson et al. |
| 2013/0172691 A1 | 7/2013 | Tran |
| 2013/0177196 A1 | 7/2013 | Lee |
| 2013/0177198 A1 | 7/2013 | Hogue et al. |
| 2013/0178718 A1 | 7/2013 | Tran et al. |
| 2013/0183952 A1 | 7/2013 | Davis et al. |
| 2013/0191553 A1 | 7/2013 | Wyler |
| 2013/0195285 A1 | 8/2013 | De La Fuente et al. |
| 2013/0197322 A1 | 8/2013 | Tran |
| 2013/0210525 A1 | 8/2013 | Sizelove et al. |
| 2013/0211291 A1 | 8/2013 | Tran |
| 2013/0231574 A1 | 9/2013 | Tran |
| 2013/0242858 A1 | 9/2013 | Amine |
| 2013/0253701 A1 | 9/2013 | Halloran et al. |
| 2013/0259283 A1 | 10/2013 | Gengler et al. |
| 2013/0275138 A1 | 10/2013 | Gruber et al. |
| 2013/0275875 A1 | 10/2013 | Gruber et al. |
| 2013/0275899 A1 | 10/2013 | Schubert et al. |
| 2013/0278631 A1 | 10/2013 | Border et al. |
| 2013/0282386 A1 | 10/2013 | Vilermo et al. |
| 2013/0286973 A1 | 10/2013 | Selia et al. |
| 2013/0287023 A1 | 10/2013 | Bims |
| 2013/0306399 A1 | 11/2013 | Swan et al. |
| 2013/0314303 A1 | 11/2013 | Osterhout et al. |
| 2013/0315429 A1 | 11/2013 | Parker et al. |
| 2013/0337796 A1 | 12/2013 | Suhami |
| 2013/0339374 A1 | 12/2013 | Skeen et al. |
| 2013/0339877 A1 | 12/2013 | Skeen et al. |
| 2014/0003619 A1 | 1/2014 | Sannie et al. |
| 2014/0032806 A1 | 1/2014 | Fils |
| 2014/0040748 A1 | 2/2014 | Lemay et al. |
| 2014/0055284 A1 | 2/2014 | Tran et al. |
| 2014/0063054 A1 | 3/2014 | Osterhout et al. |
| 2014/0063055 A1 | 3/2014 | Osterhout et al. |
| 2014/0077946 A1 | 3/2014 | Tran |
| 2014/0079225 A1 | 3/2014 | Jarske et al. |
| 2014/0079248 A1 | 3/2014 | Short et al. |
| 2014/0101608 A1 | 4/2014 | Ryskamp et al. |
| 2014/0103624 A1 | 4/2014 | Breed |
| 2014/0104059 A1 | 4/2014 | Tran |
| 2014/0112495 A1 | 4/2014 | Bodley et al. |
| 2014/0119561 A1 | 5/2014 | Banks et al. |
| 2014/0121476 A1 | 5/2014 | Tran et al. |
| 2014/0123168 A1 | 5/2014 | Reisman |
| 2014/0123186 A1 | 5/2014 | Reisman |
| 2014/0133674 A1 | 5/2014 | Mitsufuji et al. |
| 2014/0140519 A1 | 5/2014 | Shibuya et al. |
| 2014/0143064 A1 | 5/2014 | Tran |
| 2014/0163425 A1 | 6/2014 | Tran |
| 2014/0163991 A1 | 6/2014 | Short et al. |
| 2014/0177680 A1 | 6/2014 | Banks et al. |
| 2014/0180586 A1 | 6/2014 | McSchooler |
| 2014/0185842 A1 | 7/2014 | Kang et al. |
| 2014/0186012 A1 | 7/2014 | Beals |
| 2014/0188911 A1 | 7/2014 | Skeen et al. |
| 2014/0193024 A1 | 7/2014 | Raff |
| 2014/0194702 A1 | 7/2014 | Tran |
| 2014/0195252 A1 | 7/2014 | Gruber et al. |
| 2014/0219489 A1 | 8/2014 | Waldman |
| 2014/0241558 A1 | 8/2014 | Yliaho et al. |
| 2014/0249429 A1 | 9/2014 | Tran |
| 2014/0249671 A1 | 9/2014 | Halloran et al. |
| 2014/0258553 A1 | 9/2014 | Skeen et al. |
| 2014/0266787 A1 | 9/2014 | Tran |
| 2014/0270306 A1 | 9/2014 | Luna et al. |
| 2014/0270324 A1 | 9/2014 | Redmond et al. |
| 2014/0270695 A1 | 9/2014 | Banks |
| 2014/0277735 A1 | 9/2014 | Breazeal |
| 2014/0294180 A1 | 10/2014 | Link |
| 2014/0297284 A1 | 10/2014 | Gruber et al. |
| 2014/0308930 A1 | 10/2014 | Tran |
| 2014/0313303 A1 | 10/2014 | Davis et al. |
| 2014/0316771 A1 | 10/2014 | Short et al. |
| 2014/0320021 A1 | 10/2014 | Conwell |

(56) References Cited

U.S. PATENT DOCUMENTS

| | | |
|---|---|---|
| 2014/0321653 A1 | 10/2014 | Mitsufuji |
| 2014/0321658 A1 | 10/2014 | Rahangdale |
| 2014/0323142 A1 | 10/2014 | Rodriguez et al. |
| 2014/0324596 A1 | 10/2014 | Rodriguez |
| 2014/0324833 A1 | 10/2014 | Davis et al. |
| 2014/0328506 A1 | 11/2014 | Banks et al. |
| 2014/0337733 A1 | 11/2014 | Rodriguez et al. |
| 2014/0341390 A1 | 11/2014 | Gudiksen |
| 2014/0341413 A1 | 11/2014 | McKeough |
| 2014/0344294 A1 | 11/2014 | Skeen et al. |
| 2014/0355806 A1 | 12/2014 | Graff |
| 2014/0357312 A1 | 12/2014 | Davis et al. |
| 2014/0362995 A1 | 12/2014 | Backman et al. |
| 2014/0369550 A1 | 12/2014 | Davis et al. |
| 2014/0376758 A1 | 12/2014 | Barcel et al. |
| 2014/0378810 A1 | 12/2014 | Davis et al. |
| 2015/0002808 A1 | 1/2015 | Rizzo et al. |
| 2015/0003698 A1 | 1/2015 | Davis et al. |
| 2015/0003699 A1 | 1/2015 | Davis et al. |
| 2015/0005640 A1 | 1/2015 | Davis et al. |
| 2015/0005644 A1 | 1/2015 | Rhoads |
| 2015/0006181 A1 | 1/2015 | Fan et al. |
| 2015/0006186 A1 | 1/2015 | Davis et al. |
| 2015/0010189 A1 | 1/2015 | Besay |
| 2015/0016688 A1 | 1/2015 | Aller |
| 2015/0036858 A1 | 2/2015 | Aboabdo |
| 2015/0036859 A1 | 2/2015 | Tu et al. |
| 2015/0045988 A1 | 2/2015 | Gusikhin et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0065199 A1 | 3/2015 | Shah et al. |
| 2015/0067819 A1 | 3/2015 | Shribman et al. |
| 2015/0068069 A1 | 3/2015 | Tran et al. |
| 2015/0070131 A1 | 3/2015 | Beaurepaire et al. |
| 2015/0072728 A1 | 3/2015 | Rodriguez et al. |
| 2015/0088500 A1 | 3/2015 | Conliffe |
| 2015/0092108 A1 | 4/2015 | Okuhara |
| 2015/0095026 A1 | 4/2015 | Bisani et al. |
| 2015/0099941 A1 | 4/2015 | Tran |
| 2015/0105631 A1 | 4/2015 | Tran et al. |
| 2015/0106089 A1 | 4/2015 | Parker et al. |
| 2015/0110335 A1 | 4/2015 | Telemaque et al. |
| 2015/0117674 A1 | 4/2015 | Meachum et al. |
| 2015/0120336 A1 | 4/2015 | Grokop et al. |
| 2015/0120767 A1 | 4/2015 | Skeen et al. |
| 2015/0125292 A1 | 5/2015 | Karst et al. |
| 2015/0125832 A1 | 5/2015 | Tran |
| 2015/0127345 A1 | 5/2015 | Parker et al. |
| 2015/0141043 A1 | 5/2015 | Abramson et al. |
| 2015/0142618 A1 | 5/2015 | Rhoads et al. |
| 2015/0154964 A1 | 6/2015 | Ooi et al. |
| 2015/0156543 A1 | 6/2015 | Allegretti et al. |
| 2015/0162006 A1 | 6/2015 | Kummer |
| 2015/0163345 A1 | 6/2015 | Cornaby et al. |
| 2015/0163346 A1 | 6/2015 | Adams |
| 2015/0168174 A1 | 6/2015 | Abramson et al. |
| 2015/0168175 A1 | 6/2015 | Abramson et al. |
| 2015/0177010 A1 | 6/2015 | Abramson et al. |
| 2015/0181342 A1 | 6/2015 | Li |
| 2015/0194151 A1 | 7/2015 | Jeyachandran et al. |
| 2015/0194152 A1 | 7/2015 | Katuri et al. |
| 2015/0209001 A1 | 7/2015 | Wolf et al. |
| 2015/0222680 A1 | 8/2015 | Grover |
| 2015/0230033 A1 | 8/2015 | Sprague et al. |
| 2015/0237424 A1 | 8/2015 | Wilker et al. |
| 2015/0241231 A1 | 8/2015 | Abramson et al. |
| 2015/0250393 A1 | 9/2015 | Tran |
| 2015/0256795 A1 | 9/2015 | Chauhan |
| 2015/0269825 A1 | 9/2015 | Tran |
| 2015/0271552 A1 | 9/2015 | Kummer |
| 2015/0279365 A1 | 10/2015 | Sharifi |
| 2015/0279366 A1 | 10/2015 | Krestnikov et al. |
| 2015/0279387 A1 | 10/2015 | List |
| 2015/0281853 A1 | 10/2015 | Eisner et al. |
| 2015/0286873 A1 | 10/2015 | Davis et al. |
| 2015/0287422 A1 | 10/2015 | Short et al. |
| 2015/0290453 A1 | 10/2015 | Tyler et al. |
| 2015/0295946 A1 | 10/2015 | Tang et al. |
| 2015/0296282 A1 | 10/2015 | Fujioka |
| 2015/0302865 A1 | 10/2015 | Pilli et al. |
| 2015/0304502 A1 | 10/2015 | Pilli et al. |
| 2015/0309316 A1 | 10/2015 | Osterhout et al. |
| 2015/0314454 A1 | 11/2015 | Breazeal et al. |
| 2015/0316640 A1 | 11/2015 | Jarske et al. |
| 2015/0317281 A1 | 11/2015 | Sharifi et al. |
| 2015/0319546 A1 | 11/2015 | Sprague |
| 2015/0326965 A1 | 11/2015 | Sprague et al. |
| 2015/0331666 A1 | 11/2015 | Bucsa et al. |
| 2015/0339570 A1 | 11/2015 | Scheffler |
| 2015/0359467 A1 | 12/2015 | Tran |
| 2015/0363481 A1 | 12/2015 | Haynes |
| 2015/0365774 A1 | 12/2015 | Kuells |
| 2015/0370531 A1 | 12/2015 | Faaborg |
| 2015/0371215 A1 | 12/2015 | Zhou et al. |
| 2015/0371653 A1 | 12/2015 | Pilli et al. |
| 2016/0014297 A1 | 1/2016 | Aller |
| 2016/0044159 A1 | 2/2016 | Wolff et al. |
| 2016/0055858 A1 | 2/2016 | Tang et al. |
| 2016/0055862 A1 | 2/2016 | Wolff et al. |
| 2016/0063997 A1 | 3/2016 | Nemala et al. |
| 2016/0066788 A1 | 3/2016 | Tran et al. |
| 2016/0071528 A9 | 3/2016 | Short et al. |
| 2016/0086617 A1 | 3/2016 | Tang et al. |
| 2016/0100247 A1 | 4/2016 | Chang |
| 2016/0104346 A1 | 4/2016 | Ovalle et al. |
| 2016/0105530 A1 | 4/2016 | Shribman et al. |
| 2016/0110659 A1 | 4/2016 | Skeen et al. |
| 2016/0127830 A1 | 5/2016 | Hillman et al. |
| 2016/0140834 A1 | 5/2016 | Tran |
| 2016/0140948 A1 | 5/2016 | Schroeter et al. |
| 2016/0151917 A1 | 6/2016 | Faridi et al. |
| 2016/0154577 A1 | 6/2016 | Lehtiniemi et al. |
| 2016/0162469 A1 | 6/2016 | Santos |
| 2016/0170593 A1 | 6/2016 | Lehtiniemi et al. |
| 2016/0171977 A1 | 6/2016 | Siohan et al. |
| 2016/0171979 A1 | 6/2016 | Breazeal et al. |
| 2016/0187654 A1 | 6/2016 | Border et al. |
| 2016/0193732 A1 | 7/2016 | Breazeal et al. |
| 2016/0195856 A1 | 7/2016 | Spero |
| 2016/0199977 A1 | 7/2016 | Breazeal |
| 2016/0205238 A1 | 7/2016 | Abramson et al. |
| 2016/0209648 A1 | 7/2016 | Haddick et al. |
| 2016/0216130 A1 | 7/2016 | Abramson et al. |
| 2016/0217547 A1 | 7/2016 | Stach et al. |
| 2016/0231830 A1 | 8/2016 | Nemala et al. |
| 2016/0234206 A1 | 8/2016 | Tunnell et al. |
| 2016/0234551 A1 | 8/2016 | Allegretti et al. |
| 2016/0253594 A1 | 9/2016 | Chowdhary et al. |
| 2016/0269812 A1 | 9/2016 | Wilker et al. |
| 2016/0269819 A1 | 9/2016 | Wilker et al. |
| 2016/0287166 A1 | 10/2016 | Tran |
| 2016/0291595 A1 | 10/2016 | Halloran et al. |
| 2016/0302012 A1 | 10/2016 | Sprague et al. |
| 2016/0308929 A1 | 10/2016 | Fu et al. |
| 2016/0316304 A1 | 10/2016 | Sprague et al. |
| 2016/0322082 A1 | 11/2016 | Davis et al. |
| 2016/0329051 A1 | 11/2016 | Rajapakse |
| 2016/0353240 A1 | 12/2016 | Rappaport |
| 2016/0358408 A1 | 12/2016 | Ovalle et al. |
| 2016/0360965 A1 | 12/2016 | Tran |
| 2016/0372113 A1 | 12/2016 | David et al. |
| 2017/0003386 A1 | 1/2017 | Yurkov et al. |
| 2017/0024840 A1 | 1/2017 | Holub et al. |
| 2017/0032613 A1 | 2/2017 | Ovalle et al. |
| 2017/0040018 A1 | 2/2017 | Tormey |
| 2017/0041458 A1 | 2/2017 | Adams |
| 2017/0041699 A1 | 2/2017 | Mackellar et al. |
| 2017/0046124 A1 | 2/2017 | Nostrant |
| 2017/0070783 A1 | 3/2017 | Printz et al. |
| 2017/0075510 A1 | 3/2017 | Bentz et al. |
| 2017/0076749 A1 | 3/2017 | Kanevsky et al. |
| 2017/0115649 A1 | 4/2017 | Richardson et al. |
| 2017/0116483 A1 | 4/2017 | Richardson et al. |

(56) References Cited

U.S. PATENT DOCUMENTS

| | | |
|---|---|---|
| 2017/0117108 A1 | 4/2017 | Richardson et al. |
| 2017/0135543 A1 | 5/2017 | Halloran et al. |
| 2017/0143249 A1 | 5/2017 | Davis et al. |
| 2017/0147284 A1 | 5/2017 | Klimanis et al. |
| 2017/0161018 A1 | 6/2017 | Lemay et al. |
| 2017/0168566 A1 | 6/2017 | Osterhout et al. |
| 2017/0169441 A1 | 6/2017 | Ghosh et al. |
| 2017/0173262 A1 | 6/2017 | Veltz |
| 2017/0178034 A1 | 6/2017 | Skeen et al. |
| 2017/0178662 A1 | 6/2017 | Ayrapetian et al. |
| 2017/0188437 A1 | 6/2017 | Banta |
| 2017/0193711 A1 | 7/2017 | Lenchner et al. |
| 2017/0195640 A1 | 7/2017 | Pasternak |
| 2017/0195815 A1 | 7/2017 | Christoph et al. |
| 2017/0206064 A1 | 7/2017 | Breazeal et al. |
| 2017/0206908 A1 | 7/2017 | Nesta et al. |
| 2017/0213554 A1 | 7/2017 | Faaborg |
| 2017/0221487 A1 | 8/2017 | Faaborg |
| 2017/0228973 A1 | 8/2017 | Ovalle |
| 2017/0228974 A1 | 8/2017 | Ovalle |
| 2017/0228975 A1 | 8/2017 | Ovalle |
| 2017/0234691 A1 | 8/2017 | Abramson et al. |
| 2017/0236006 A1 | 8/2017 | Davis et al. |
| 2017/0236365 A1 | 8/2017 | Ovalle |
| 2017/0236368 A1 | 8/2017 | Ovalle |
| 2017/0243318 A1 | 8/2017 | Aller |
| 2017/0249122 A1 | 8/2017 | Pance et al. |
| 2017/0250004 A1 | 8/2017 | Ovalle |
| 2017/0250005 A1 | 8/2017 | Ovalle |
| 2017/0250006 A1 | 8/2017 | Ovalle |
| 2017/0257595 A1 | 9/2017 | Newell et al. |
| 2017/0272697 A1 | 9/2017 | Moses |
| 2017/0278590 A1 | 9/2017 | Ovalle |
| 2017/0278591 A1 | 9/2017 | Ovalle |
| 2017/0279957 A1 | 9/2017 | Abramson et al. |
| 2017/0280235 A1 | 9/2017 | Varerkar et al. |
| 2017/0287592 A1 | 10/2017 | Ovalle |
| 2017/0287593 A1 | 10/2017 | Ovalle |
| 2017/0287594 A1 | 10/2017 | Ovalle |
| 2017/0289341 A1 | 10/2017 | Rodriguez et al. |
| 2017/0316780 A1 | 11/2017 | Lovitt |
| 2017/0323481 A1 | 11/2017 | Tran et al. |
| 2017/0323703 A1 | 11/2017 | Ovalle |
| 2017/0323704 A1 | 11/2017 | Ovalle |
| 2017/0330471 A1 | 11/2017 | Subiakto |
| 2017/0344114 A1 | 11/2017 | Osterhout et al. |
| 2017/0347886 A1 | 12/2017 | Tran |
| 2017/0352236 A1 | 12/2017 | Moses |
| 2017/0358940 A1 | 12/2017 | Parikh et al. |
| 2017/0359459 A1 | 12/2017 | Howe et al. |
| 2017/0359860 A1 | 12/2017 | Howe et al. |
| 2017/0361468 A1 | 12/2017 | Cheuvront et al. |
| 2017/0366909 A1 | 12/2017 | Mickelsen et al. |
| 2018/0001184 A1 | 1/2018 | Tran et al. |
| 2018/0020530 A1 | 1/2018 | Scordato et al. |
| 2018/0020931 A1 | 1/2018 | Shusterman |
| 2018/0024845 A1 | 1/2018 | Anthony et al. |
| 2018/0033454 A1 | 2/2018 | Hardek |
| 2018/0047125 A1 | 2/2018 | Stach et al. |
| 2018/0047408 A1 | 2/2018 | Wolff et al. |
| 2018/0053284 A1 | 2/2018 | Rodriguez et al. |
| 2018/0068103 A1 | 3/2018 | Pitkanen et al. |
| 2018/0070143 A1 | 3/2018 | Joffe et al. |
| 2018/0082702 A1 | 3/2018 | Nickel et al. |
| 2018/0089654 A1 | 3/2018 | Licht et al. |
| 2018/0096256 A1 | 4/2018 | Chowdhary et al. |
| 2018/0096752 A1 | 4/2018 | Ovalle |
| 2018/0113673 A1 | 4/2018 | Sheynblat |
| 2018/0117479 A1 | 5/2018 | Coolidge et al. |
| 2018/0121766 A1 | 5/2018 | McCord et al. |
| 2018/0132037 A1 | 5/2018 | McGibney |
| 2018/0133583 A1 | 5/2018 | Tran et al. |
| 2018/0146833 A1 | 5/2018 | Halloran et al. |
| 2018/0158447 A1 | 6/2018 | Maziewski et al. |
| 2018/0168459 A1 | 6/2018 | Tran |
| 2018/0174598 A1 | 6/2018 | Shabestary et al. |
| 2018/0174620 A1 | 6/2018 | Davis et al. |
| 2018/0176215 A1 | 6/2018 | Perotti et al. |
| 2018/0182384 A1 | 6/2018 | Coolidge et al. |
| 2018/0182387 A1 | 6/2018 | Chua et al. |
| 2018/0184907 A1 | 7/2018 | Tran |
| 2018/0186433 A1 | 7/2018 | Gharabegian |
| 2018/0187447 A1 | 7/2018 | Gharabegian |
| 2018/0189645 A1 | 7/2018 | Chen et al. |
| 2018/0196633 A1 | 7/2018 | Mittal |
| 2018/0199683 A1 | 7/2018 | Gharabegian |
| 2018/0206028 A1 | 7/2018 | Conliffe |
| 2018/0211666 A1 | 7/2018 | Kolavennu et al. |

FOREIGN PATENT DOCUMENTS

| | | |
|---|---|---|
| RU | 2381631 C1 | 2/2010 |
| WO | WO2015123658 A1 | 8/2015 |

* cited by examiner

MODULAR QUICK-CONNECT A/V SYSTEM AND METHODS THEREOF

CROSS REFERENCE TO RELATED APPLICATION

The present application is a
Continuation of U.S. patent application Ser. No. 16/043,018, filed Jul. 23, 2018, now U.S. Pat. No. 10,715,906, issued Jul. 14, 2020, which is a
Continuation of U.S. patent application Ser. No. 15/160,550, filed May 20, 2016, now U.S. Pat. No. 10,034,079, issued Jul. 24, 2018, which is a
Division of U.S. patent application Ser. No. 14/623,941, filed Feb. 17, 2015, now U.S. Pat. No. 9,351,060, issued May 24, 2016, which is a
Non-provisional of U.S. Provisional Application 61/940,311, filed Feb. 14, 2014, the entirety of which are each expressly incorporated herein by reference.

The application is related to U.S. patent application Ser. No. 15/160,656, filed May 20, 2016, now U.S. Pat. No. 9,794,679, issued Oct. 17, 2017, which is a Division of U.S. patent application Ser. No. 14/623,941, filed Feb. 17, 2015, now U.S. Pat. No. 9,351,060, issued May 24, 2016.

FIELD OF THE INVENTION

The present invention relates to the field of consumer electronics entertainment devices, and more particularly to an audio entertainment system and associated methods.

BACKGROUND OF THE INVENTION

Each cited reference is expressly incorporated herein by reference in its entirety.

US20140177680 discloses a communication system including a host transceiver, one or many device transceivers, and a wireless or wired link, in which encoded digital audio data and optionally also other auxiliary data are transmitted and received between the host transceiver and one or many device transceivers. Packets of encoded audio data are wirelessly transmitted from a host using a modulation scheme adaptive to error rate US20140119561 discloses an apparatus that includes an AV receiver with a wireless audio module (WAM) host which wirelessly bidirectionally communicates with plurality of speakers each having a WAM device to enable bi-directional communications with the WAM host and provide automatic configuration, e.g., determining a location for each speaker in order to identify each speaker, setting time delay parameters for each speaker, and setting volume parameters for each speaker.

US20130306399 discloses a customizable modular speaker system, which includes one or more acoustic modules; one or more optional spacer modules coupled to the acoustic modules; and one or more end caps that can be coupled to the acoustic or spacer modules. The modules and endcaps, when assembled, formed a substantially continuous T-slot. The T-slot is capable of engaging a wall mounting cradle which in turn can affix the speaker to a surface with a mounting bracket to create a wall mounted speaker. In other instances, where a shelf or tower speaker is desired, the T-slot engages a spine mounted in a base. The present modular system allows for the same components to be assembled into a bookshelf speaker, a tower speaker, a sound bar, or a wall speaker.

US20070160225 discloses a Bluetooth loudspeaker with a self-configuring network which searches for the other loudspeakers, and which can automatically create a table of mutual visibilities, and, on that, define a hierarchical network topology. One of the loudspeakers is designated as the network head so as to be capable of searching for and setting up a wireless link with a remote peripheral capable of transmitting a coded audio signal (A2DP) and/or a control signal (AVRCP). The other loudspeakers receive audio signals sent to them encapsulated in messages that include routing data, either directly, or after said signals have been relayed via another loudspeaker.

U.S. Pat. No. 8,165,333 discloses a modular speaker system which includes a base assembly having a longitudinally extending, central support member and a support leg extending therefrom in a manner supporting the central support member in a generally upright configuration. The central support member includes a first end and a second end. A first woofer is secured to the base assembly, and a base assembly amplifier is mounted within the central support member and connected to the first woofer. An auxiliary speaker assembly includes a longitudinally extending, auxiliary support member having a first end a second end, the first end being shaped and dimensioned for selective engagement with the second end of the central support member. A first driver is secured to the auxiliary speaker assembly and an amplifier is mounted within the auxiliary support member and is connected to the first driver.

EP2557813 and US20130039527 disclose a system for configuring an audio reproduction system having moving speaker elements, having a processor that generates an adapted loudspeaker signal, taking into account the movement.

See also, 20150036859; 20150036858; 20150010189; 20140376758; 20140355806; 20140362995; 20140341413; 20140341390; 20140328506;1 20140321658; 20140321653; 20140270695; 20140270324; 20140270306; 20140241558; 20140219489; 20140193024; 20140177680; 20140140519; 20140133674; 20140119561; 20140032806; 20140003619; 20130315429; 20130306399; 20130282386; 20130259283; 20130210525; 20130191553; 20130177198; 20130170684; 20130089217; 20130058022; 20130039527; 20130028457; 20120204213; 20120250924; 20120183158; 20120114151; 20120058727; 20120002356; 20110274286; 20110222720; 20110123054; 20110112664; 20100322445; 20100119078; 20100030563; 20100020999; 20090296964; 20090238384; 20090191911; 20090175216; 20090110216; 20090079705; 20090081948; 20090067640; 20090029745; 20080304692; 20080212971; 20080168312; 20080152164; 20080101638; 20080062251; 20080045140; 20080024686; 20070237337; 20070230723; 20070206827; 20070160225; 20070154041; 20070147644; 20050185801; U.S. Pat. Nos. 8,873,239; 8,839,342; 8,578,081; 8,855,349; 8,554,045; 8,537,543; 8,503,709; 8,483,757; 8,477,953; 8,437,493; 8,385,561; 8,351,638; 8,320,824; 8,315,406; 8,311,254; 8,290,196; 8,275,159; 8,270,651; 8,254,623; 8,250,724; 8,204,260; 8,189,848; 8,189,822; 8,165,333; 8,155,370; 8,150,092; 8,150,085; 8,145,821; 8,126,182; 8,126,159; 8,121,329; 8,098,868; 8,098,856; D651,421; 8,090,130; 8,054,987; D643,020; 7,987,294; 7,961,900; 7,937,109; 7,933,637; 7,929,446; 7,856,256; 7,844,920; 7,831,756; D619,995; 7,653,344; 7,643,855; 7,603,150; D601,546; 7,567,680; 7,489,508; 7,483,538; 7,475,990; 7,469,053; 7,415,290; 7,274,797; 7,269,255; 6,910,548; 6,035,962; each of which is expressly incorporated herein by reference.

When consumers typically purchase an audio speaker based entertainment systems, such as a Bluetooth or Wi-Fi speaker, they are of a fixed size, shape, and static underlying communication and access technology, fixed processing capabilities, with no or little ability or mechanism to change or modify the internal or external parts, drivers, pieces, or frequency response, printed circuit boards, or other technology components outside of a warranty or repair service. They may be designed with such technology as to allow two or more distinct Bluetooth systems to recognize each other and synchronize the simultaneous playback of content, but they are not intended for greater detailed customization or personalization. Additionally, existing systems inherently have a built in obsolescence, because as technology changes, or the consumers listening and communication requirements change, their existing products are unable to be updated, modified, or enhanced, rendering them obsolete, except for any backwards compatible technology.

Further, as consumers more deeply engage technology at home and on the go, there is a need to consolidate and integrate functionality and capabilities into a centralized multifunctional system that is able to scale and grow, learn and anticipate, change and be easily modified for the individual, family, or business/commercial needs, requirements, and environment with intuitive integration, and updatable software, firmware, and systems. Where a typical home or venue may have examples of the following technologies in one or more room throughout a location, such as a stereo, computer speakers connected to the computer, a television sound-bar, a baby monitoring system, a home security and monitoring system, (that may or may not include a remote video or audio monitor), a videoconferencing camera capabilities, a fixed landline phone—perhaps with a room to room intercom system, a music library on a phone, a television, computer monitor showing stored video or still image photographs, a clock radio, lights, a Wi-Fi router, an external hard drive/media storage device, these and other technologies all based upon unrelated technologies, with no controllable and centralized integration and control.

SUMMARY OF THE INVENTION

The present technology provides a modular and customizable (submodular) system which provides, among other functions, audio output as a function of an exemplary module.

A module is a self-contained element of the system that is typically self-contained and environmentally protected. It typically has a set of functionality that permit it to operate somewhat independently, though it may rely on other modules for specific functions.

A submodule is a component of a module, which typically is not itself environmentally protected on all sides, and may rely on other submodules within the module for essentially functionality.

In some cases, a submodule may be functionally complete and protected, but may be considered a submodule due to its intended (but not required) placement in conjunction with other submodules. For example, a battery operated alarm clock faceplate submodule might fall within this category. Likewise, in some cases, a module may require functional support from another module, and or endoskeleton. For example, a subwoofer without electronic driver might fall within this category.

In the context of a speaker system, it may be desired to provide a variety of different type drivers, with different frequency ranges, directionality, efficiency/loudness, sound processing enhancements, as possible differences between modules or submodules. Likewise, a sound system may be built with a plurality of modules which serve different or additive functions, such as the bass, mid range and treble drivers of a 3-way speaker, distributed between two or three modules. In this case, a first type module would include, for example, a bass audio driver submodule, amplifier submodule, crossover/equalization submodule; and communications module, and provide electrical or wireless interconnection to communicate with other modules, and power (e.g., 120 VAC, 12 VDC, 5-6 VDC, USB, Power over Ethernet, inductive power coupling, etc.), and may include a rechargeable battery submodule. A second module might include the mid-range and treble driver submodules, electronic and interface submodule, and power submodule, and may also include a rechargeable battery submodule.

Advantageously, each module may include an identification and authentication integrated circuit, which may communicate over a simple and relatively slow serial interface, powerline communication technology, or employ RFID or RF or NFC communication technologies. Typically, one module within a system will be a control module or submodule, and the control would manage module and submodule identification and authentication. However, it is also possible to have distributed and decentralized identification and authentication, or provide such services through a remote server. Additionally, each system is designed to work with and coordinate with other systems.

The controller, in addition to identifying and authenticating individual systems and components, allows users to authorize/de-authorize use of panels, adjust power distribution to panels, self-diagnose parts and panels, identify which parts are not working properly, monitor power consumption, identify power configuration and adjust to optimal levels, manage power from all attached power sources, and shut down unwanted/unneeded elements and other systems.

The controller may be housed in a mandatory control panel, one of which is required for system functionality. The controller may be sealed in a watertight, non-accessible base, or generally accessible for upgrades and enhancements, but may still reside within a environmentally sealable enclosure.

Basic communications between modules or control systems is preferably through Bluetooth 4.0 or wired connections (e.g., 100 Mbit, 1 Gbit, 10 Gbit Ethernet, USB 2.0, USB 3.0, USB 3.1, Thunderbolt (1, 2, 3), HDMI, Lightening), though other licensed or unlicensed radio may be used, such as 802.11a/b/g/n/ac/ad/etc. In some cases, instead of digital communications, audio signals may be communicated as analog modulated waveforms, such as through NTSC whitespace, 900 MHz, 2.4 GHz and 5.4/5.8/5.9 GHz bands. The module may act as an access point, signal amplifier or booster or repeater, or as a multiplexor.

Communications outside a set of modules, such as to a remote server, preferably employ TCP/IP or UDP over 1Pv4 or 1Pv6 protocols. Within a set of modules, these same standards may be employed, or other communications protocols as may be appropriate.

Between modules that are mechanically interfaced, there is preferably an electrical connection, that provides at least low voltage power, and digital communications according to a consumer electronics standard, such as Ethernet IEEE-802.3, Token bus/ring IEEE-802.4 802.5, USB 2.0, USB 3.0, 3.1, Lightening interface, Thunderbolt interface, etc. The connectors may be as defined by the specifications, or customized. For example, the electrical contacts between modules may comprise gold plated leaf springs and contact pads. Advantageously, each module has a generally required submodule that includes an electrical interface, power distribution, identification/authentication, and at least a minimum level of control logic.

While modules may come in various shapes and sizes, it is preferred that basic modules conform to a standard form factor of about a 4" cube, with each face of the cube being a removable submodule retained in place by an "exoskeleton", and within the cube a bridging structure called an "endoskeleton". Further, consistent with an emphasis and audio output functionality, the endoskeleton within the cube is preferably designed to accept a speaker driver on at least two faces, preferably four faces, and most preferably six faces (though in most instances, at least one face of the cube will be occupied by a non-speaker submodule or abutted against another module, and thus precluding general occupation of all six available slots for audio drivers. However, the panels affixed to the module may be of any type, including cone speakers, flat panel or electrostatic speakers, control modules, a support for one or more speaker drivers disposed external to the form factor of the module, a panel configured to support sub-panels, radio modules, display and/or projector modules, and the like. For example, the endoskeleton advantageously provides at least 2 cm clearance behind the center of the front face of the panel to accommodate the voice coil and magnet of a cone speaker.

One aspect of the modular quick connect multifunctional communication and entertainment system will be able to identify system panels, submodules, parts, and accessories connected to or associated with a system and communicate and manage system wide requirements automatically and dynamically, and respond and distribute power and signals and processing based upon the requirements of each modular element paired with, plugged into, or attached to either or an exoskeleton or endoskeleton of the system. The system, for example, identifies and manages the data and inputs accessed, signals emanating from and between the panels and submodules, and communicates with and is authorized by the system and controllers. System functionality includes, but is not limited to, access (cloud based, internet, cellular, WiFi, nodes, sensors, etc.), control, process, store, send, receive, analyze, update, learn, insert, compile, compare, integrate, distribute, power, communicate, dynamically change, phone, signal, radio, respond, anticipate, authenticate, allow, encrypt, recognize, determine environmental conditions, emergencies, and the like.

The system may provide its own user interface, in the form of a module or submodule, which may include a graphic display, projector, audio/speech input and/or output, touchscreen, keyboard, gesture interface, video camera, buttons, or any combination or sub-combination thereof. Alternately or in addition, a smartphone or tablet device may be used to control the system or portions thereof. The modular system may include a processor, such as a quad core ARM v7 processor, with associated memory and peripherals, and execute various standard operating systems such as Linux, Android, iOS, Windows 8, Tizen, PalmOS, or other operating system, with an "app" or software program provided to define the interface. Alternately, an embedded web server in the module can communicate with a browser, e.g., using HTML 5.0, thus eliminating the need for custom software or apps in the smartphone/tablet/control device. If the system is controlled by a separate device, the user interface device may communicate with the system by infrared or optical communications, radio frequency communications, or acoustic or ultrasonic signals.

The system is preferably designed to allow for multiple different technologies to co-exist via incorporation of technologies within an added "Panel", working in conjunction with, or alone, within the power and distribution system within, on, or around the "exoskeleton housings" and or the "endoskeleton internal structure", and the associated processors, or co-processors, and managed by the system software.

Further, consumers of entertainment and communication systems and devices generally do not hear and listen to music the same way, or desire the same type of audio output from their entertainment systems. Additionally, based upon personal, environment, and communicated influences, one may wish to change or modify their entertainment and or communication system to suite different moods, attitudes, locations, etc. Some like to experience something as simple as a more high end audio frequency, such as those associated with treble (tweeter), or midrange, or full spectrum speaker drivers, with some wishing more and deeper bass output, or the chest thumping beat of a subwoofer, and others still want a strobe or other lighting elements and or projectors, or other options accompanying their music and playback.

The system preferably allows consumers to attach such mechanisms to the exoskeleton and endoskeleton, and even to other Panels, to achieve this customizable configuration.

According to one embodiment, at least one submodule of a module comprises a display, such as an electronic paper display, liquid crystal display or organic light emitting diode display, that is visible by a user during normal use. This display is driven by a controller which receives information through a wired or wireless network from a remote server. The remote server provides updates or a stream of static graphics or video to be displayed on the display. A synchronized or unsynchronized audio presentation may accompany the displayed information. The display may include advertisements, which may be of a broadcast (untargeted) nature, or may be targeted to the module or user in proximity to the module. The module may include a human, animal, or like proximity sensor, e.g., a passive infrared sensor or camera, to determine that a person, animal, or the like is nearby, or to identify the person(s) in proximity. The presentation may be interactive, that is, the user may be provided with inputs that are responsive to what is displayed or presented. In the case of advertising, a user subsidy may be accounted for to help defray the cost of the modules and/or content presented through the modules. The accounting may be on a user or module basis, or based on a relationship between the content provider, the server that delivers the content, and the advertiser. Whereas in prior embodiments, an example of a singular cube shape is provided, with Panel attachments with different submodules, e.g., speaker drivers on each side, a further embodiment also provides an additional sleeve element that encompasses the cubes and individual panels, and submodules, and other shapes can fit inside. For example, a housing may be provided in the shape of alphabet letters, where the letters are designed to allow for either individual panels and or submodules, which can be, for example, speaker drivers, lighting elements, or such other functionality as desired to be attached to any facing, plane, or sides of the letter, creating functional speaker letters allowing audio emitting signage and ornamental designs, which can be initials or names of a location in the form of an entertainment system and playback device. Additionally, custom housings may be provided in the shape of logo's, brand identifiers, images, photographs, etc. to accommodate the system panels and accessories in order to further customize and personalize the system. These housings may also allow for other forms of customization including graphic, printing, inserts, to accompany, wrap, or decorate these form factors.

A further embodiment also provides for a "Security Panel", that may contain some stored data, physical material, or protected space, that is released based upon some input, signal, or programming criteria. Additionally, the Security Panel may control access to a location, or information, and may be incorporated into prior embodiments, letters, displays, etc. Such a security panel or submodules incorporating the security features may incorporate contain one or a combination of facial recognition, fingerprint scanner, heat signature detector, voice signature analyzer for security purposes, perhaps utilizing or incorporating cameras, projectors, sensors, LCDs, to gain access to a location, site, or controlled information. These security panels or submodules, may, for example, be incorporated into a display screen, with the panels and submodules arrayed around the display screen, allowing for modular security elements to be customized based upon the depth or control, secrecy, or access associated with material or an individual.

In a cube form factor, typically, the submodules have rigid faces, formed for example of plastic, aluminum or steel (typically perforated), and the exoskeleton advantageously provides a rounded, soft corner which protects the cube module and supporting furniture from damage due to sharp contact. Therefore, the exoskeleton exposed surfaces are preferably formed of a non-brittle plastic or rubber, with sufficient impact absorption capacity to avoid significant damage to the cube for drops of about 1 foot, and to avoid significant marring hardwood surfaces from drops of about 6 inches. The exoskeleton is, for example, a glass fiber reinforced ABS thermoplastic molded in two halves to form a cube scaffold. The endoskeleton serves the function of supporting internal components, such as circuit broads, and may also provide rigidity for the module structure as a whole. The internal connections within a module may be epoxy circuit boards plugged into connectors, flexible circuit boards with printed electronics, or other technologies.

In addition to audio drivers, microphones, displays, cameras, and user interface components, a module may include various sensors, lighting, communications, controllers and processors, the module may include an aroma dispersant system, and other ornamental or functional components, without particular limitation. Because of an intended placement of the module in the center of a living space, the module may include environmental integration, such as a smarthome controller/interface, telephone, remote control for other devices, alarm sensors and interface, etc.

Consumers are also, now more often than not, inclined to use their cell phones for their home, rather than installing traditional "land-lines". With the growing reliance on mobile, portable smart devices, there is also a need for a communication and entertainment systems and devices to facilitate greater communication and interaction with mobile and portable devices as it relates to audio consumption and distribution, and also for replacement of the phone functions such as intercom systems, monitoring systems, be it for audio or video, and for image capturing, be it passive or active, and the ability to access this content and information both locally and remotely.

Certain modular panels, be it a combination of one or more, can be attached to the Endoskeleton and Exoskeleton to allow for the functionality of a combination of speakerphone, camera, video projector, LCD screen, intercom, and the like.

The system may also act as a location safety and monitoring system with built in sensors and monitors that can determine changes in environmental conditions within a room such as excessive or changes (may be predetermined or not) in temperature, heat signatures, noxious gases (carbon monoxide, explosive gasses, thiols), water/moisture, movement, proximity alarms, motion detection, glass breaking etc. The addition of a "Sensor Array Panel" can sense, acting alone or in conjunction with other sensors, remote, or local accessory elements may indicate a programmed environmental condition, be it hazardous or not, and trigger alarms, coordinate or integrate with other existing home security systems, and indicator or point to an egress location in the event of a fire, such as lighting up the window frame of an egress point, or light a path with moldings, or light up the sash or lock area of an door. The System, or combination of Systems and Panels, may allow for the triangulation, identification and pinpointing of individual with a location, the proximity to the origins or locations of an event such as fire or other noxious hazardous conditions, and signal or trigger alarms, and or vocal warnings and responses based upon the situation, or proximity of an individual or person or pet, and instruct required actions, indicate points of egress, instructions, locally and remotely facilitate emergency procedures and notifications, calls, SMS, and other emergency responses. Home integration system functionality advantageously employs Z-Wave or Zigbee communications, and therefore a compatible communication submodule may be included in the system. The proximity sensors can determine movement in/out of a location, such as a child's bedroom, e.g., someone who may be prone to sleepwalking or night terrors, and trigger an alarm, which may include a text message, telephone call, email, HTML message, etc., or for tracking human movements in/out of a room, house, location, based upon permissions such as a curfew, or for use with the elderly location based tracking and indicator source. In general, the module(s) will communicate through a separate internet gateway, the module system may also include a cellular data communication device (e.g., 3G, 4G, LTE, LTE LAA, WiMax, or the like) and therefore be independent of other local infrastructure for external communications.

Other triggers, based upon the sensor array, may turn on or off, clock projection, or light panel startup or dimmer, different channels, audio, video based upon your entrance or exit from a location, and/or may turn the system into stand-by mode, off, or some other status.

Based upon the identification and tracking of individuals within the range of the system, the system is also designed to identify individuals within proximity, determine usage habits, entertainment consumptions, with associated media content, ambient temperatures, during what time of day, communicating what information, using what social media or program or universal resource locator (URL), and learn and extrapolate such data as determined to be of interest to those particular users. Examples of the same would be other entertainment content that like identified users purchase or consume, and offer, via such means as email, text, voice activation via the system, or delivered via a display submodule, the ability for the consumer to purchase, rent, download, try and buy, type experiences. Utilizing such intelligence, the system could adjust, amongst other things, playback, volume, equalize the signals, control lights and dimmers, thermostat, and appliances accordingly.

Embodiments of the technology generally relate to a modular and customizable communication and entertainment system platform, be it for example a wired or wireless audio or visual devices such as, audio/visual speaker systems, headphones, sound bars, networked speakers, phone systems, intercom systems, or the like. The system may also scale to professional or commercial modules, such as DJ systems, club and commercial venue based audio video playback devices, with such professional or commercial modules having different sizes or form factors, as well as functionality, to suit the intended usage. Typically, a professional or commercial module will have more limited general purpose functionality, and will typically rely on wired communications and higher power acoustic outputs. The modules may be placed and controlled as a single location or a multi-location system.

A module or submodule (or set of submodules in combination, that may be spread across a plurality of modules) may provide audio/visual monitoring, which can include passive and/or active sensors. Note that a particular sensor may be used for a variety of purposes, by different applications within or external to the system. According to one embodiment, low data rate sensors such as toxic gas sensors, illumination sensors, or passive infrared movement sensors may stream their output periodically through a data bus, which can then be captured by hardware or software elements which monitor the bus, or respond to polling. On the other hand, high data rate sensors, such as video or audio information, may buffer the output stream, and respond to polling to transfer the buffer contents, or selectively stream the audio or video when enabled. Indeed, high data rate or real time data may employ a different data bus architecture than low data rate devices. Thus, for example, different network architectures may be provided which are deterministic on one hand, such as a centrally controlled or a token passing network, and a statistical collision sense/multiple access on the other. The deterministic network architecture is better suited to real time conveyance of datastreams that tend to saturate network capacity, while statistical access control is better suited to bursty data that is tolerant of variable latency.

According to one embodiment, suitable sensors and control software and algorithms are provided to implement baby room monitoring, "nanny-cam" type monitoring, parental or child's room or location protection/zone monitoring, work place monitoring, and remote monitoring.

The system and method is preferably made up of different replaceable and reconfigurable/self-configurable modular functional elements/parts that connect and work together to form this hardware, software, and updateable system. The system is modular in nature, and in general, permits any mechanically compatible submodule to be placed in any location within a module or network of modules forming the system, such that the submodule informs the controller(s) of its presence and identity, authenticates itself as may be necessary or appropriate according to usage or protocol, and the system automatically configures itself to permit the submodule to operate and interoperate with the other submodules. Likewise, a module (which typically contains one or more submodules) can also be added to or removed from the system in an ad hoc manner, with the other modules and submodules reconfiguring as necessary to support the system change.

In some cases, a module or submodule is necessary, and therefore system operation ceases when that module is removed. For example, in a system that has a single controller, removal of the controller would prevent any intelligence of the system, and therefore it would cease to operate, except as permitted as a regular speaker, if analog connections are available. In other cases, when a module or submodule is added, there is some redundancy in the system. For example, an added module may include a controller which has redundant features with a controller already preexisting in the system. In this case, the two controllers identify each other, and a hierarchical rule may be applied to use the more capable controller as the primary controller, with the less capable controller relegated to operation as a backup and slave device. In some cases, the multiple controllers may interoperate as a coproccessing or parallel processing network, to provide enhanced capabilities. Where two identical controllers are present, these may be selected based on an arbitrary but predictable criterion, such as lower serial number, signal strength, power consumption optimization, etc. Another option is to provide redundant and failsafe operation of both controllers at the same time. In power (e.g., battery) or power dissipation constrained applications, one controller may be deactivated completely and placed in a standby, hibernation or deactivated mode, or only certain aspects and functions of the control may be utilized.

In the case of audio drivers, the system may enter an adaptive mode to determine the sound environment in which each submodule is operating. This adaptive mode may include a specific equalization mode in which special signals are emitted, or apply adaptive updating based on normal sounds emitted through the system and detected by a microphone or microphone array. In some embodiments, the location of each module may be determined, such as by RFID localization and triangulation, or use of GPS or assisted GPS technology (e.g., GPS satellite plus time difference of arrival [TDOA] to a base station). In a typical system, the user will seek to implement a bilaterally symmetric set of acoustic drivers. However, for a variety of reasons, the resulting system may be or become asymmetric, based on room shape and size, occupancy, different modules and module characteristics, and the like. The controller may implement a psychoacoustic model seeking to optimize the actual sound produced in the environment for the listeners in that environment, on a continual basis. In some cases, the content, which may be music, is mixed by the producer contemplating a particular presentation environment. This may differ for each work. To supplement the local optimization, the work itself may be identified, and the controller query a remote server to determine optimal parameters for presentation of the work, which can then tune the local controller for best results. For example, the controller can control equalization for each driver, delay and echo (with separate equalization for the echo), phase and phase relationships with other drivers, resonance compensation, and in some cases, directional vectors. In some embodiments, the acoustic output is optimized for a single listener in the environment, and may compensate for movements of the listener in the environment during presentation. In a video playback mode, the system may also control synchronization of sounds with screen action.

According to one embodiment, the modules, and to a lesser extent submodules, employ quick-connect technologies to permit mechanical and electronic reconfiguration without tools or special skill. For example, simple mechanical latches, detachable hinges, magnets, and the like may be used to form reliable mechanical and electrical connections during normal operation, yet permit easy alteration as desired by a user. The modules, submodules, and the quick-connect technologies, alone or together may contain a locking mechanism allowing for a more secure attachment, or security control provision for the different elements.

The controller may receive a variety of user control signals, including button and touchscreen (resistive, capacitive, acoustic, optical, etc.) presses, audio and speech recognition, video and gesture recognition, digital communication from infrared remote controls, Bluetooth, WiFi, Zigbee, ZWave, NFC/RFID communications, and the like. The controller may implement direct control through dedicated inputs, a set of predetermined menus, a hypertext defied set of menus, or an adaptive system for user control. The control system preferably employs machine learning of user preferences, distastes, habits, and patterns. The controller may execute applications, similar to those intended for smartphones, which are downloadable through a communication network, and/or may interface with the user through HTML5 or the like. Indeed, the controller may be a smartphone, either embedded into a module, or provided through a wired or wireless connection of a standard smartphone, such as Apple iPhone, Android 4.X, or 5.X, Windows 8.1 or 10, Blackberry, Linux, or the like. The controller may also be similar to a Raspberry Pi, or other single board computer based on the ARM RISC technologies, Intel x86/x64 technologies, or MIPS technologies, for example. In some cases, one or more modules may require a high level of computing performance, to provide the features, for example, of Apple TV, TiVo DVR, or more generally a desktop operating system (Windows/Apple/Linux), workstation, or gaming system. In such cases, an entire module may be dedicated to such usage, and may forego internal modularity distinct from the standard set of computing modules used by such systems (DIMM, SATA, USB 2, USB3, wired Ethernet, thunderbolt, HDMI, DVI, ⅛" audio, SD card, etc.).

Another embodiment provides for use of the system alone, in conjunction with, or accessory to a gaming system such as a Microsoft X-Box, Sony Playstation, or Nintendo Wii system, for example. Incorporation into such systems as a massively online gaming system, or for individual or local consumption and use, with and incorporating such panels as video, lights, audio, projectors, working as an independent accessory, or with full integration with gaming panels designed for deep integration. Such Panels may offer multiple functional elements such as access to capabilities, functions, tools, weapons, instructions, help and assistance, protection, etc. In it noted that one module may incorporate or interface to a full Microsoft Kinect or Kinect 2 sensor system or the functions thereof, see. e.g., en.wikipedia.org/wiki/Kinect.

Another embodiment is use of the system alone, in conjunction with, or accessory to a Gambling system, where an individual can access, be authenticated, identified, and securely sign-into a gambling site, make wagers, remotely participate in group gaming, interact with a dealer, other players, within a site or network. Gaming Panels may allow for particular security or location protocols, or allow for specific Gaming elements, or updateable with software and firmware to purchase, acquire, or access different feeds or functions.

Another embodiment is use of the system alone, in conjunction with, or accessory to a remote school/university learning and testing system. Such a system and associated modules could utilize Security Panels to authenticate an individual or student, monitor signals and access and use of the internet, cell and other signal processing sources, and restrict the same during teaching and testing scenarios. A secure video camera and microphone system in a module may be used to monitor a student during testing. A secure browser may be implemented to restrict access to unauthorized web sites and to unauthorized functions during testing.

Another embodiment is the use of the system alone, in conjunction with, or as an accessory to a patient medical monitoring, remote caregiver monitoring, doctor interface or diagnostic system, emergency response system via different functional Medical Interface Panels. Such panels may act alone, or in conjunction with, other intelligent devices or smartwear. Such devices include patient monitoring devices and sensor embedded in clothing, braces, shoes, attached external monitors, in addition to such items as smartwatches and bands, eyewear, monitoring accessories. Identifying and coordinating multiple inputs within, on, or around the systems, and triggering appropriate responses. Such panels or submodules may include specific medical sensor arrays that detect and monitor such activities, as respiration, heart, pulse, pressure, moisture, humidity, time, elongation, stress, glucose/Ph, wear, resistance, motion, temperature, sleep detectors, impact, rotation, flexibility, and perspiration. The panels can contain or interface with such intelligent devices or smart apparel, and trigger functions contained therein, or accessories attached to a patient, such as a defibrillator, IV systems, airbags, transdermal delivery systems, stimulators, vibrators, heat delivery and controls, cold delivery and controls, liquid and gas dispensers, etc.

While this disclosure generally refers to modular speakers within an entertainment and communication system, aspects of the modular system may include 1) the different types, shape, and sizes of the "exoskeletons housings", 2) type, shape, and sizes of modular "endoskeletons internal structures" within a "exoskeleton housing", 3) the type, shape, and size, and functional elements of the identification, control, and distribution circuitry that fits modularly within, on, or around or in conjunction with either or the "endoskeleton internal structures" designed into, for example, the printed circuit boards "PCB's" or the like control mechanism, and or 4) type, shape, and sizes of the modular "Panels" that attach to, or are in proximity with, and specifically designed functional elements contained therein or on, and 5) the accessories that attach thereto, and 6) the software system and functions that controls the entertainment and communication system, for the identified, recognized, authenticated, and decrypted elements of this system.

Embodiments of the invention may include specially designed modular exoskeleton housing designs of different shapes, sizes, and materials or combination thereof, to which panels such as a speaker(s) and/or accessories, may be attached. A modular endoskeleton (internal structure) is preferably provided that fits inside of, contained within and conforms to the different size exoskeleton housing, and panels. Preferably, a module includes a command, control and power distribution module, which controls the speakers and/or accessories and interfaces. The control module may also be provided in a separate housing, and communicate electrically with the module through electrical connector(s). The control, in turn, may be self-sufficient, or operate in conjunction with other controls which may be within the same system, part of an external infrastructure, in the Internet or within a public or private cloud, which may be local or remote with respect to the module. The control may execute software, to provide data capture and analysis, validation, programming, downloading and uploading, playback, viewing, tracking, activations, social connectivity, sharing, and distribution, and a feedback mechanism for consumer, commercial, and industrial applications.

It is therefore an object to provide a modular speaker system, comprising: an exoskeleton, configured to mechanically support and quick attach and release at least one functional panel; a corresponding electrical interface provided within the exoskeleton for each respective functional panel, configured to mate with a corresponding electrical connector of each respective functional panel; and an electrical bus electrically connected to the electrical interface, and configured to communicate signals through the electrical interface from each corresponding electrical connector to at least one of a signal source and a signal sink.

It is also an object to provide a method of operating a modular audio system, comprising: providing an exoskeleton, configured to mechanically support and quick attach and release at least one functional panel, the at least one functional panel having at least one audio transducer; communicating through a corresponding electrical interface provided within the exoskeleton for each respective functional panel, mating with a corresponding electrical connector of each respective functional panel; and communicating signals through an electrical bus electrically connected to the electrical interface, from each corresponding electrical connector to at least one of a signal source and a signal sink.

The electrical interface may provide regulated electrical power to operate the at least one functional panel. The electrical interface may communicate an analog signal, a point-to-point digital communication signal, and/or a digital packet data network communication signal, for example. The electrical interface may provide regulated electrical power to operate the at least one functional panel. The electrical interface may communicate power, and both a digital signal and a corresponding analog signal.

The system may further comprise the at least one functional module, the at least one functional module comprising an acoustic speaker. The modular speaker system may further comprise an audio amplifier configured to power the speaker. The at least one functional speaker module may comprise a digital memory storing at least one of an audio profile and an identifier associated with an audio profile accessible through the electrical interface, further comprising an automated processor configured to read the digital memory, and produce a control signal for the at least one functional speaker module selectively dependent on the audio profile.

The system may further comprise an automated digital processor, configured to receive a digital audio signal, read a respective audio configuration profile or identifier of a respective audio configuration profile from a memory within each of at least two functional speaker modules, and optimally control each of the at least two functional speaker modules in dependence on at least the received digital audio signal and each of the respective audio configuration profiles.

The exoskeleton may have a rectangular prismatic form factor, and may be configured to support, e.g., at least four functional panels, and being configured to interface with a power supply through the electrical interface.

The at least one functional module may comprise an acoustic speaker and a memory storing at least one of a stored audio profile and an identifier of a stored audio profile, further comprising retrieving the stored audio profile, and converting a digital audio signal into a power analog audio signal to operate the acoustic speaker, in dependence on the stored audio profile.

The at least one functional module may comprise a plurality of acoustic speakers and a plurality of memories storing at least one of a stored audio profile and an identifier of a stored audio profile for each respective acoustic speaker, further comprising retrieving the stored audio profiles, and converting a digital audio signal into a power analog audio signal to operate each respective acoustic speaker, in dependence on the stored audio profiles.

The exoskeleton may have a rectangular prismatic form factor, and be configured to support at least four functional panels, the method further comprising supplying power from the exoskeleton to the at least four functional panels through the electrical interface.

It is a further object to provide a method for operating a modular speaker system having interchangeable acoustic speaker elements each having respectively different acoustic emission properties selected from the group consisting of frequency equalization and directionality characteristics, comprising: attaching at least one interchangeable acoustic speaker element to a base, the at least one interchangeable acoustic speaker element having a memory shoring at least one of a profile representing characteristics of the respective interchangeable acoustic speaker element, and information locating a profile representing characteristics of the respective interchangeable acoustic speaker element; reading the profile representing characteristics of each respective interchangeable acoustic speaker element by an automated digital processor; and selectively generating a set of respective interchangeable acoustic speaker element control signals by the automated digital processor, selectively in dependence on the profile representing characteristics of each respective interchangeable acoustic speaker element and acoustic source data.

The at least one interchangeable acoustic speaker element may comprise at least two interchangeable acoustic speaker elements having differing frequency response, and wherein the automated digital processor selectively controls the at least two interchangeable acoustic speaker elements to provide an equalized composite frequency response, or differing directional acoustic emissions, and wherein the automated digital processor selectively controls the at least two interchangeable acoustic speaker elements to provide an optimized composite acoustic emission.

DETAILED DESCRIPTION OF THE PREFERRED EMBODIMENTS

Figure 1:
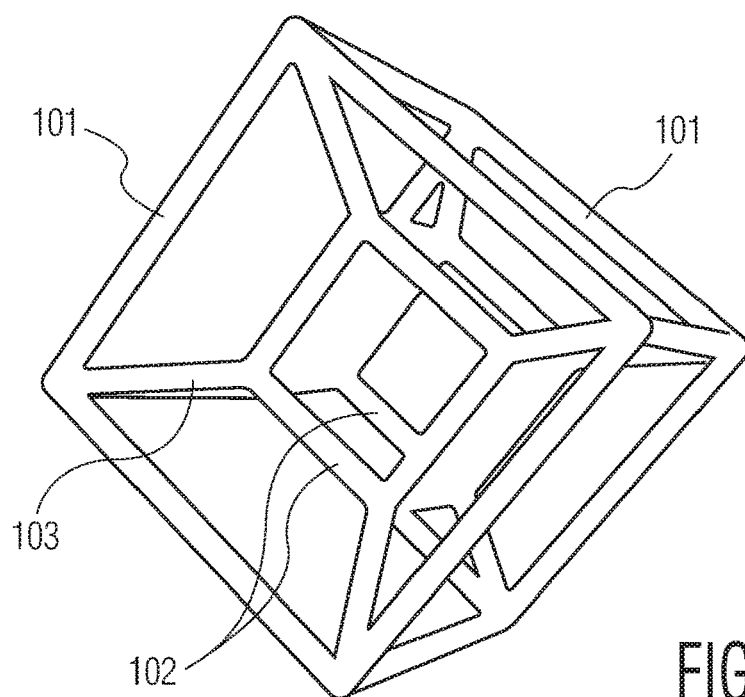
FIG. 1 shows a perspective view of an exoskeleton and endoskeleton structure.

Embodiments of the invention provide, according to one embodiment, a modular quick connect multifunctional communication and entertainment platform. This system is customizable in a variety of ways and adaptable for a variety of uses. For example, certain embodiments allow a user to customize their listening experience with modular speaker driver panels such as a tweeter, midrange, woofer, subwoofer, active and passive radiators, in a multitude of different shapes, sizes, and formats all with quick connect interchangeable parts that allow for a personalized audio/visual system. In certain embodiments, one can achieve multiple layers of drivers on a single facing of an available plane where one can have a first attached larger bass driver panel, with the option of placing another smaller panel attachment containing a mid-range panel, or the like, over, behind, or around the facing of the panel already attached to the housing, thus creating a multi-tiered approach. In others, one can attach another device, a light element for example, that can be its own panel, or can work in conjunction with an existing panel, and be controlled in conjunction with the existing panel, or separately, or timed to synch with, all controllable options.

A single system panel, may itself be modular, such that the facing may be made up of multiple elements that fit together, and may be preconfigured, or may be designed such that the user can pick and choose the different functional or aesthetic elements that they wish to make up the panel. Where a square face is used, the square may be made up of 4 equal parts, where each subpart is a different driver type (tweeter, woofer, midrange, full range, etc.) that are also modularly attachable to each other, and then to the exoskeleton housing unit and or the endoskeleton internal structure. Alternatively, each part may encompass a light (illuminator), camera, projector, and/or storage, allowing a single panel to record audio and video still images or moving video, record the content locally or via the network remotely, project the content upon a surface, and have that panel interface with other capabilities of the system for which it is attached.

Whereas some embodiments establish external Panel configurations, and an ability to layer a multitude of drivers, electronics, and accessories to the exoskeleton and endoskeleton, in other embodiments, the endoskeleton will facilitate pull out and fold out driver and electronic elements, such that when deployed, these elements extend beyond the protected and contracted state of a closed module. Such designs include, but are not limited to, a draw pull out, which, when extended, includes a panel that unfolds, can lift and pivot, presenting either one or multiple devices such as speaker drivers, LCD, LED or the like, or display panels, touch screens, or monitors, or screens, light elements, antenna array, sensor arrays, etc.

An exoskeleton or housing may contain a fixed or pre-configuration of product pull-out, or may be modular in nature allowing a user to insert multiple drawers with different functional elements, that operate one way when not extended, versus another when fully extended and all internal elements unfolded.

An additional embodiment allows for other types of plug-in products with connection/input mechanisms and enhancement capabilities. Such power plug type items would contain or communicate and be authorized to work with, power or be powered, authorize or be authorized, and control or be controlled via an interface mechanism, or add other functionality to the system such as an inline power, amplifier, repeater, connector, surge protector, microphone array, of the like, where the plug-in may not contain the full structure of a typical panel, but may allow for a subset plug-in capabilities into an existing panel or into the exoskeleton or endoskeleton.

Certain housings may have a fixed set of panels and or function, which may be modularly added to other sets of housings. Some housing may act solely as a communication hub, supporting, for example, WiFi, Bluetooth, internet access/routing, cloud based computing, as a computer or like processor, a dedicated speaker driver, etc.

Certain panels may contain plug-in ports, in any one or combination of such as Ethernet (RJ45, 8P8C), USB, HDMI, micro USB, 3.5 mm audio ports, digital audio input, Firewire (IEEE-1394), cable jacks, phone jacks, ac/dc power ports, wired speaker ports, sensor arrays, microphones, processors, co-processors, power, detectors, SD or micro SD cards, storage, antennas, etc.

Given the personalization and customization desires of consumers, the system facilitates greater customization via different size and shape exoskeletons and endoskeleton configurations in the forms of letters of the alphabets in any language, logos, brand identity, products, and custom design configurations. Various panels, containing all manners of capabilities, such as speaker drivers, electronics, or accessories, designed for the system, fit in on or around these letters or shapes. For example, an "A" shape enclosure may be designed to hold some number of panels, for example 7, with 3 on each leg of the A, and one on the bridge, allowing the consumer to pick a letter, initials, or a full name of a person, place, or thing, and incorporate all technologies and capabilities into the chosen letters.

Further, the letters or shapes may have different capabilities for sitting on a surface, hanging on a wall, or being suspended from an object, ceiling, or the like. These letters or shapes may be water proof, and made of a variety of materials, and may attach together, or be operated separately, or may be powered together or alone, and may be controlled by the same program if desired. They may be stackable, or attachable to one another, and there may be different forms of a platform or case that holds the letters, and the said platform or case may offer some additional functional element in support of the system, including, but not limited to, power, signal, processing, etc. The letters or shapes advantageously are used as commercial signage, and may be used to present advertising content to passers-by, mood music, or the like.

The system may also allow for the option to capture, stream, view, protect, project, or monitor visual or video data, as still or motion images, with built in or modular add-on video accessories within on or around the system. Other embodiments may also facilitate room to room or location to location audio-visual communications (e.g., video conferencing), intercom type systems, and audio visual monitoring.

Embodiments of the modular quick connect audio/visual system can be used in conjunction with an audio and/or video source to output AV signals. Examples of audio sources may include, but are not limited to, digital media players, smartphones, computing devices, tablets, e-readers, televisions, set-top boxes. CD players, or other similar devices. The modular quick connect⁻ system allows the user to create their own personalized driver configuration, made up to include a single driver or a combination of driven including, for example: tweeters, midrange, bass, woofers, subwoofers, active and passive radiators, transducers, etc. Each of these available drivers is configured in a modular quick connect form, and configured to fit inside a host of housing shapes and sizes. A user can start with a single speaker/driver, and add or modify speaker/drivers over time, based upon available budgets, changes in sound preferences, or the user's environment. A driver's modular quick connect form accomplish several tasks including the ability for the quick connect mechanisms to facilitate the pathways for all required signal distribution through-out the ecosystem, but also ensure module to module connectivity, stability, and accessory modularity so that standards allow for a plug and play technology. Additionally, the quick connect mechanisms may include the ability to facilitate and implement quick connect protocols and communications.

FIG. 1 depicts an illustrative embodiment of a configuration of the modular quick-connect system. A cube shaped quick connect housing unit holds up to six (6) different modular walls (four around, and top and bottom). Each side of the housing or modular wall can be configured with a selected modular component. Typically, the lower face will be occupied by a power entry module with basic user interface elements, such as an on-off switch, master volume, mute, and the like. The base may also provide a supporting platform somewhat larger than the cubic faces, to provide stability in case of extended height. Likewise, the top face may be occupied by an inter-module connector element, facilitating stacking of cubes. The inter-module connector element provides mechanical and electrical interconnection of the modules, and may also house other components, including sensors, controllers, lighting, etc. The inter-module connector element may permit adjacent cubic modules to abut each other, or have an arbitrary distance between them. According to one embodiment, a non-directional driver, such as a subwoofer, is housed in a base panel, along with its associated amplifier, which may consume more power than other types of modules. A passive radiator element may be provided in an upper panel. According to some embodiments, the inter-module connector element provides a cylindrical pole that spaces the modules by an arbitrary distance.

The four side faces may, for example, be occupied by various panels. Preferably, each side is configured to house a selected, specific driver type with an easy click or stick together attachment mechanism so that up to six different driver types may be employed with the cubed body. By way of illustration, the four side modular wails can be configured with 1 tweeter, 1 midrange, and 2 bass units.

In keeping with the modular design, a user may start with a single speaker: driver, and add or modify speakers/drivers over time, based upon available budgets, changes in sound preferences, or the user's environment, or enhancements to the technology. If a user seeks more midrange output, then the user simply adds or swaps a side, two, or three with more midrange drivers.

A "brain panel" may be provided, which advantageously integrates a graphic user interface, audio and video interfaces with a programmable processor. While controllers may be embedded within a module and not occupy an external face, in many cases, the integration of an externally exposed user interface with a controller is efficient.

In some cases, a panel, i.e., a faceplate for a cubic (or other shape) exoskeleton, is subdivided into multiple subplates. Architecturally, a frame is preferably provided which mates to the exoskeleton, and provides electrical connection, mechanical support and quick release features. The subpanels, which may be, for example one quarter of a panel size (i.e., 2 inches square for a four-inch panel) may each have separate functions, though these may be redundant, such as tweeters.

As shown in FIG. 1, a cubic wire frame exoskeleton 101 is provided, which supports an internal exoskeleton 102 through linkages 103. The pyramidal recess in the exoskeleton 101 extending to the endoskeleton 102 to accommodate a speaker cone. The linages 103 may be used as supports for circuit boards, and the like.

Advantageously, the exoskeleton has a set of magnets (or magnetically permeable material) at each corner, for each face. The panels or sub-panel mount has a corresponding set of magnets (or magnetically permeable material) at each corner, such that when a panel is proximate to its home position, the magnets automatically center and hold the panel in place. An electrical connector is provided for each panel or faceplate element.

A variety of quick connect technologies are available to connect panels to modules, and modules to each other or interconnection plates. For example, attachment may be secured by a bayonet type socket (e.g., providing a suitable configuration on a ring attached to the exoskeleton and the aperture 604), cotter pins or other types of pins, statistical fasteners (e.g., Velcro®), latches, hooks, snaps, retractable-member linkages (e.g., parallelogram linkage, rack and pinion, radial retraction, etc.), screws or bolts (these can be quick release, depending on the thread design, or can be internally motorized), or other known means. In some cases, a panel or subpanel may be permanently attached or attached through a non-quick-release technology. For example, where a panel or another module has non-generic modular connections made to the module, another panel, another module, or the like, it may be preferred to prevent quick release of the panel or module to avoid interrupting persistent and non-modular internal elements.

For example, the connector may be electrically compliant with USB 2.0, USB 3.0, or USB 3.1, with each module capable of acting as master or slave (auto sensing). USB 3.1 provides the advantage of higher power capability (~15 W, 5V @3 A), and higher data rates, though it consumes more power. A USB hub device is provided within the exoskeleton, to arbitrate and propagate signals within and across modules. Of course, other communications schemes may be employed.

Figure 2:
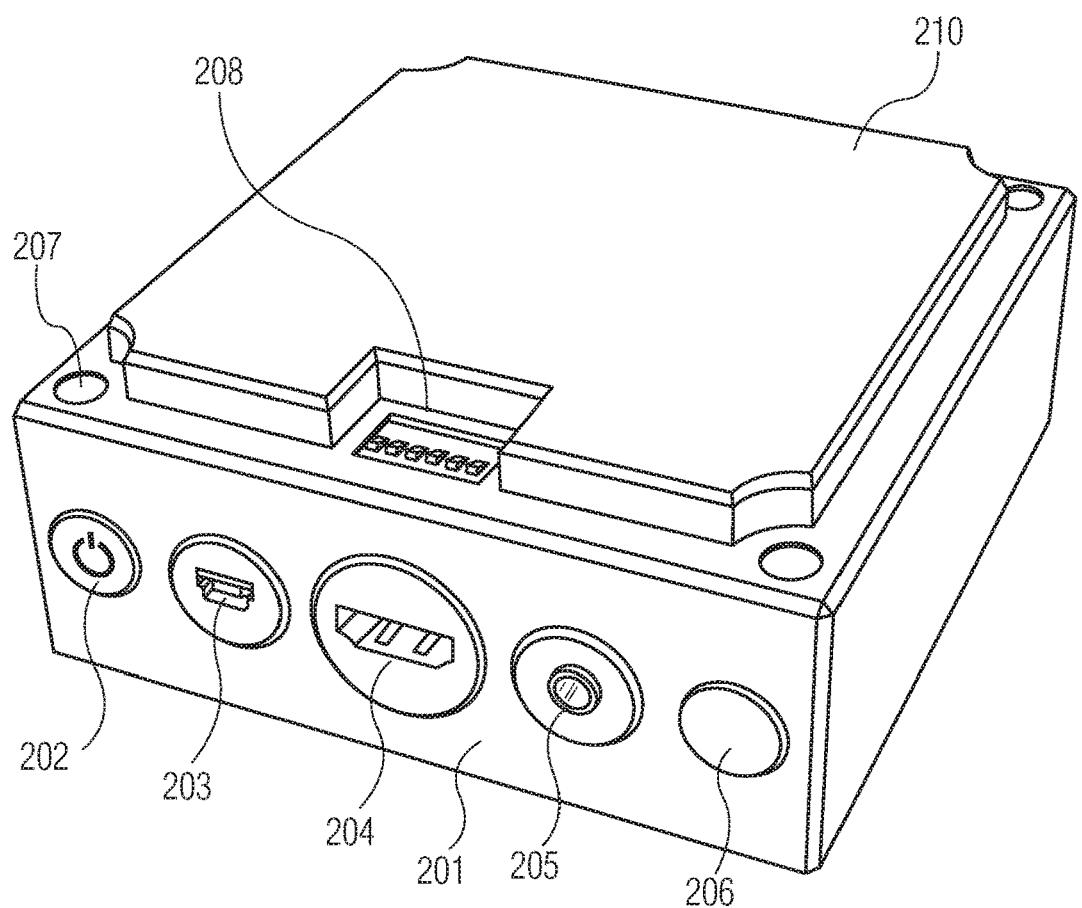
FIG. 2 shows a perspective view of a base module, controlling power for other modules, providing external data and audiovisual interfaces, and having an electrical connector which interfaces with another module, according to a first embodiment.

FIG. 2 shows a base module 201, which provides power, audio visual control, and electrical interfaces for an entertainment system. The based 201 provide an on-off switch 202, USB 2.0, 3.0, or 3.1 interface 203, HDMI and/or eSATA interface 204, 3.5 mm audio plug analog interface, and a software programmable button interface 206. The top surface 210 of the base module 201 sits under the exoskeleton 101, and is attached through a set of magnets 207 provided in the corners. An electrical connector 208 links to an electrical bus of an adjacent module, and in the case of the base, supplies power to other modules. As shown in FIG. 2, the base includes the HDMI and/or eSATA interface 204 typically provides a higher data rate than is available through the electrical connector 208, and therefore an audio visual controller is contained within the base module 201 to generate the HDMI signals. The base module may include various radio transceivers, such as IEE-802.11ac, and therefore internal or external antennas (not shown) may be provided.

Figure 3:
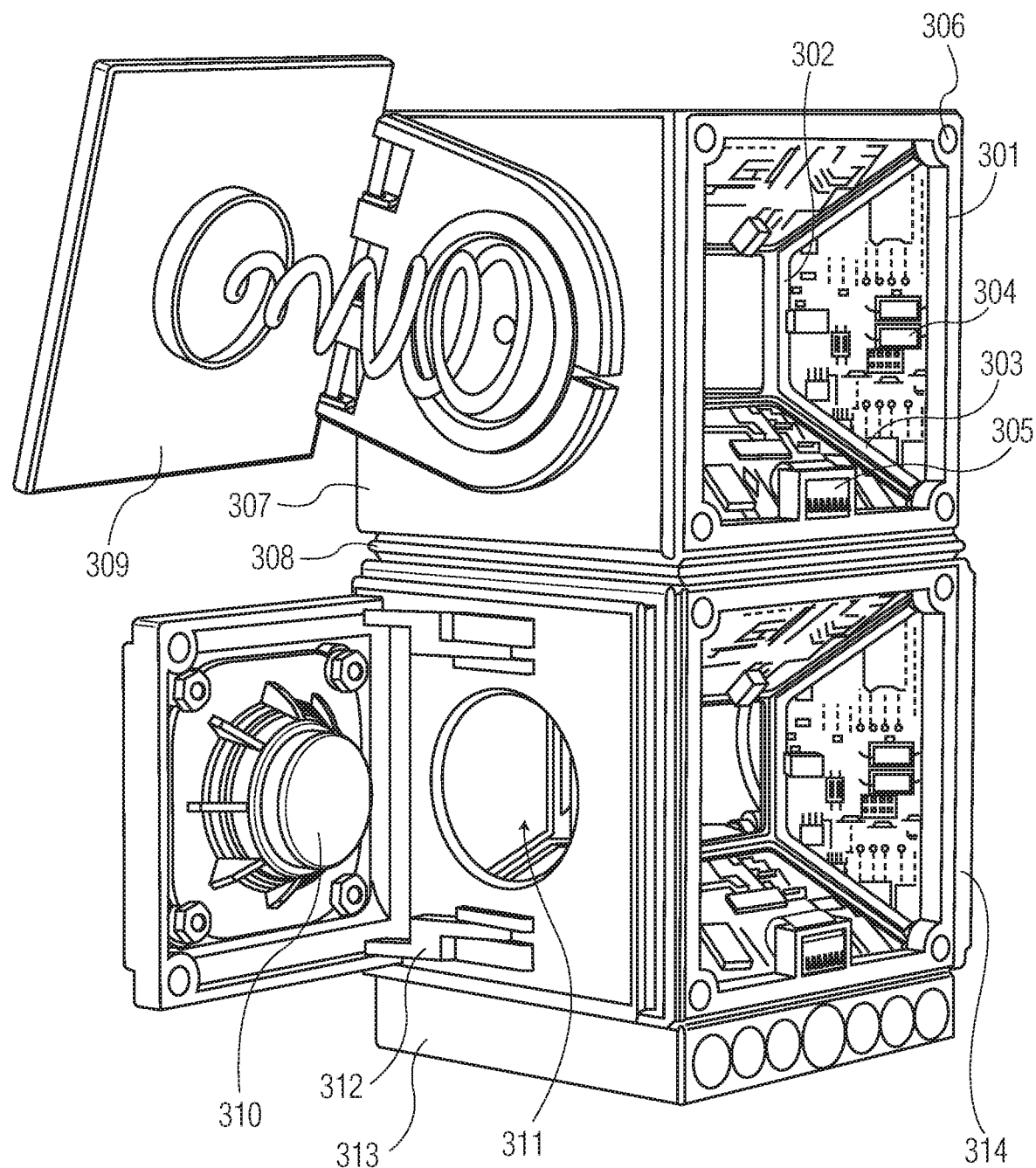
FIG. 3 shows a perspective view of an assembled set of modules, showing a base module providing a power supply, a lower module having an articulated cone speaker, and an upper module having an articulated flat panel speaker, according to the first embodiment.

FIG. 3 shows a set of three interconnected modules. A base module 313, similar to the base module 201, provides power and control. The base module 313 is mechanically and electrically connected to a lower module 314, which supports an articulated cone speaker 310 module having hinged support 312. The articulated cone speaker 310 can fold back into the module with a rear magnet of the articulated cone speaker 310 extending into aperture 311. An interface panel 308 connects the upper module 307 to the lower module 313. The upper module supports an articulated flat panel speaker 309. The internal details of the upper module 307 and lower module 313 are similar. The exoskeleton 301 has a set of corner magnets 306 on each corner, e.g., 24 in total. Bridging between the endoskeleton 302 and exoskeleton 301, bounded by the bridging members 303 are a set of circuit boards 304, which are modular, i.e., can be replaced to provide different functionality. For example, a circuit board may be a class "D" amplifier, using power supplied by the base module 313 to power the analog signal that powers the speaker. An electrical interface 305 is provided on each face of the upper module 307.

Figure 4:
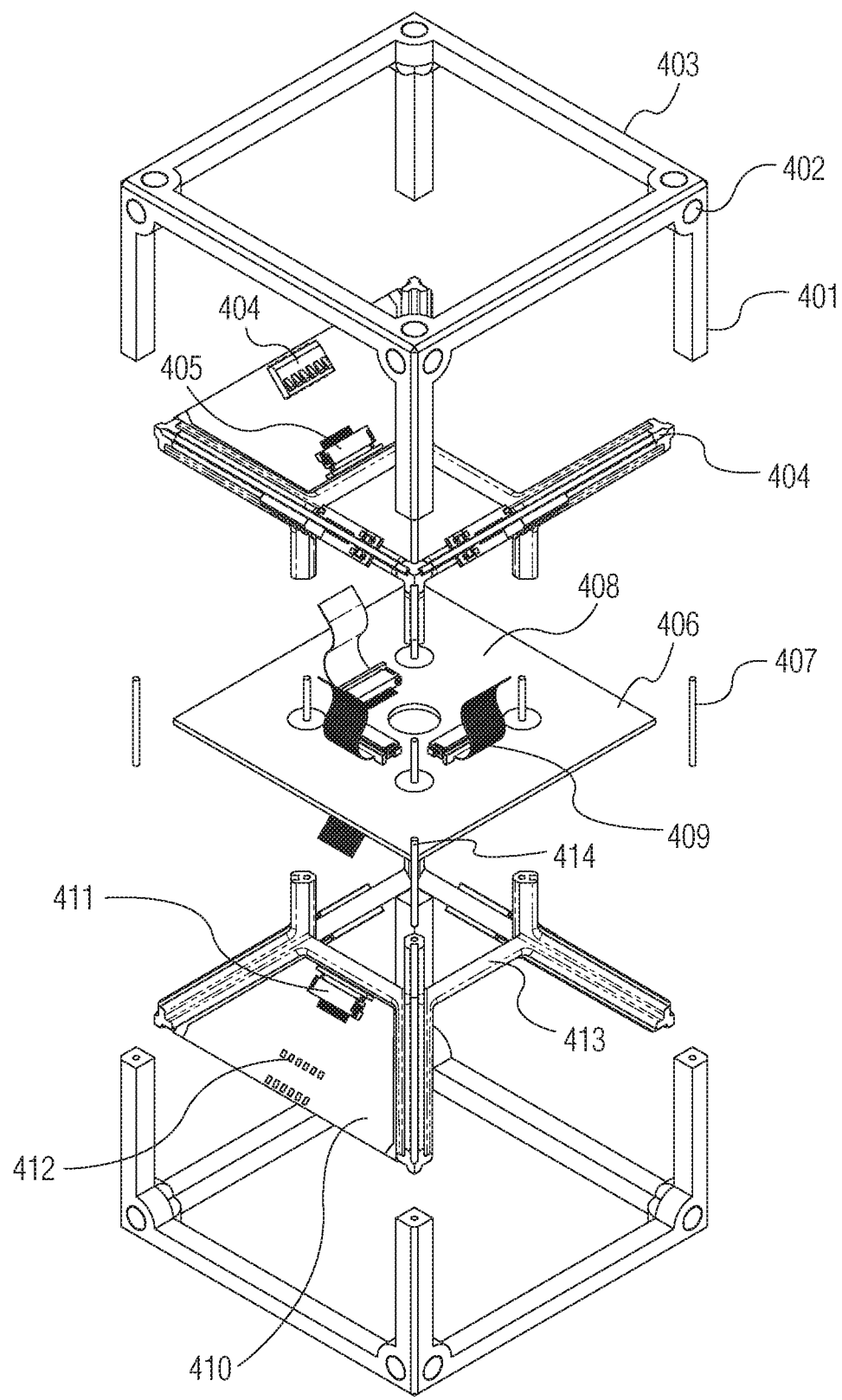
FIG. 4 shows an exploded view of the exoskeleton and endoskeleton structure, including circuit boards and electrical connectors, according to a second embodiment.

FIG. 4 shows an exploded view of a second embodiment, which differs from the first embodiment principally in the placement of the electrical interface 404 (rear side 412 shown), which in the second embodiment is located on the circuit board 410 and not the exoskeleton 403. Similar to the first embodiment, the exoskeleton 403 has a set of corner magnets to attach panels in a quick-release fashion. The endoskeleton 413 is connected to the exoskeleton 403 through bridging members 404. Each circuit board 410 has a connector 411 that links to a corresponding connector 405 on the endoskeleton 413. The endoskeleton 413 corresponding connector is in turn connected to a central circuit board 406 through a ribbon connector 409. The exoskeleton 403 is provided as two parts, each with a half-length member 401 that are connected together with a pin 407. Likewise, the endoskeleton 413 is provided as two parts, each with a half-length member that are connected together with a pin 414, which penetrate through the central circuit board 406.

Figure 5:
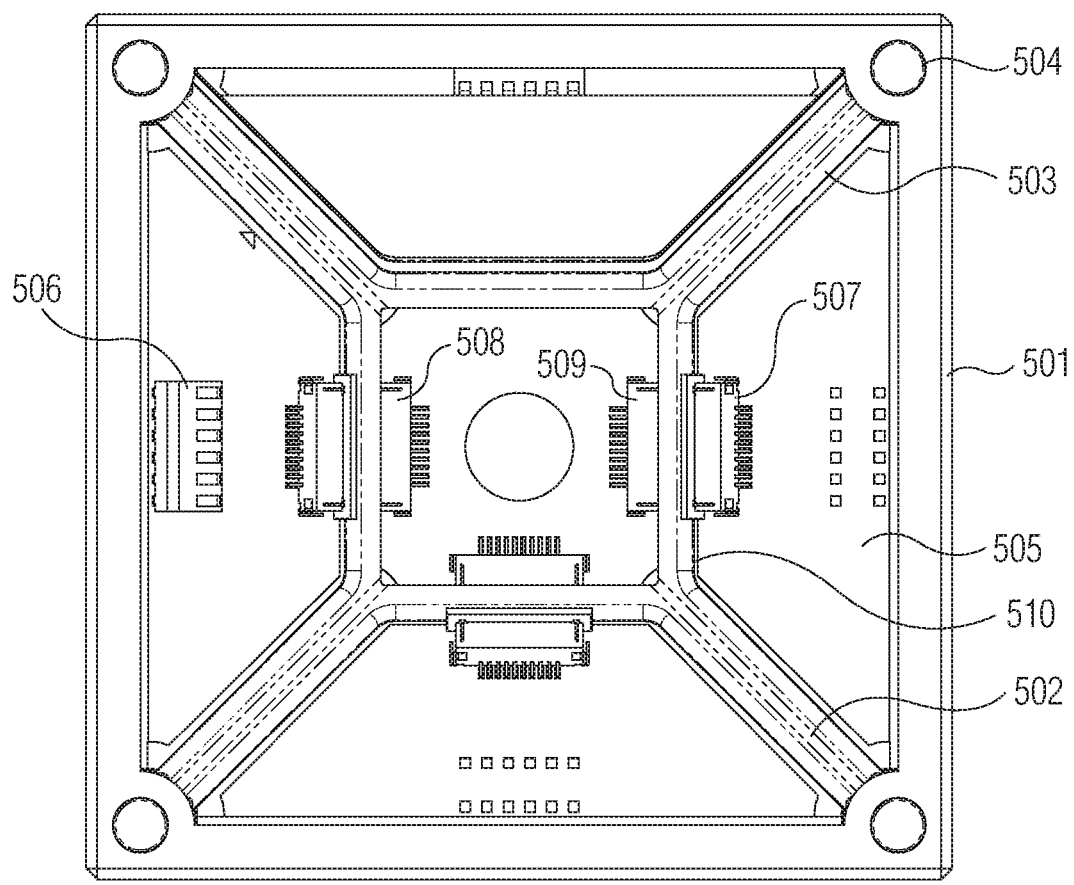
FIG. 5 shows a top view of the exoskeleton and endoskeleton structure, including circuit boards and electrical connectors, according to the second embodiment.

FIG. 5 shows a top view of the module according to the second embodiment. The exoskeleton 501, bridging members 503 and endoskeleton 510 support a set of circuit boards 505, which in turn support electrical interfaces 506 to external modules (not shown) and connecting through connector 507 and corresponding connector 509 to the central circuit board 508. Set of corner magnets 504 are provided to attach panels to the module. The magnets are typically rare earth (e.g., samarium-cobalt).

Figure 6:
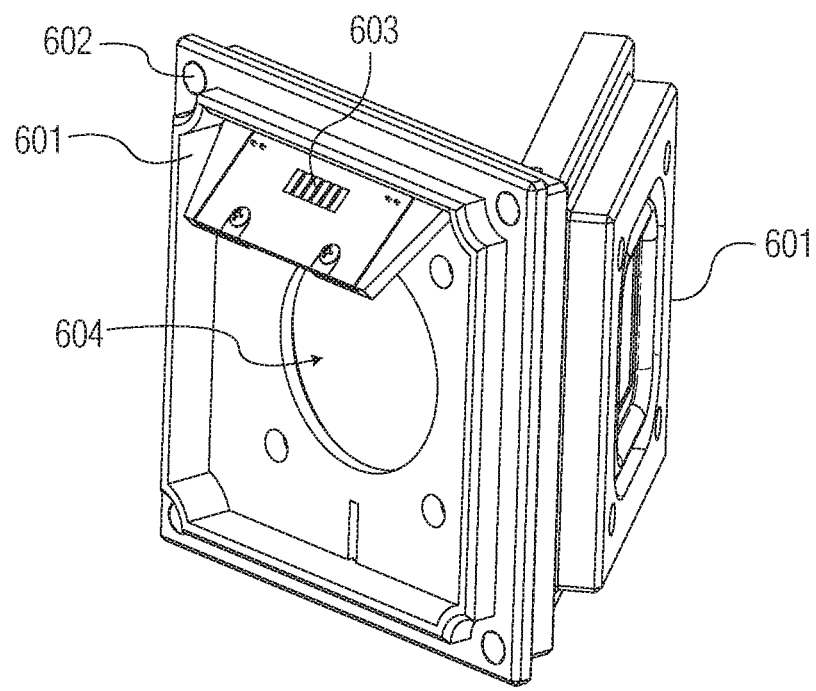
FIG. 6 shows a rear perspective view of an articulated speaker panel for attachment to the exoskeleton and endoskeleton structure according to the second embodiment.

FIG. 6 shows a speaker panel 601 suitable for attachment to the exoskeleton according to the second embodiment. In particular, the panel 601 has an electrical connector 603 configured to interface with the electrical interface 506. Each panel has a corresponding set of corner magnets 602 poled so as to be attached to the corner magnets 504 of the module. The corresponding set of corner magnets 602 are typically rare earth. The speaker panel 601 has an aperture 604 to allow a rear-extending cone and magnet assembly of a speaker to fold into the module, and thus retract to a cube.

Figure 7:
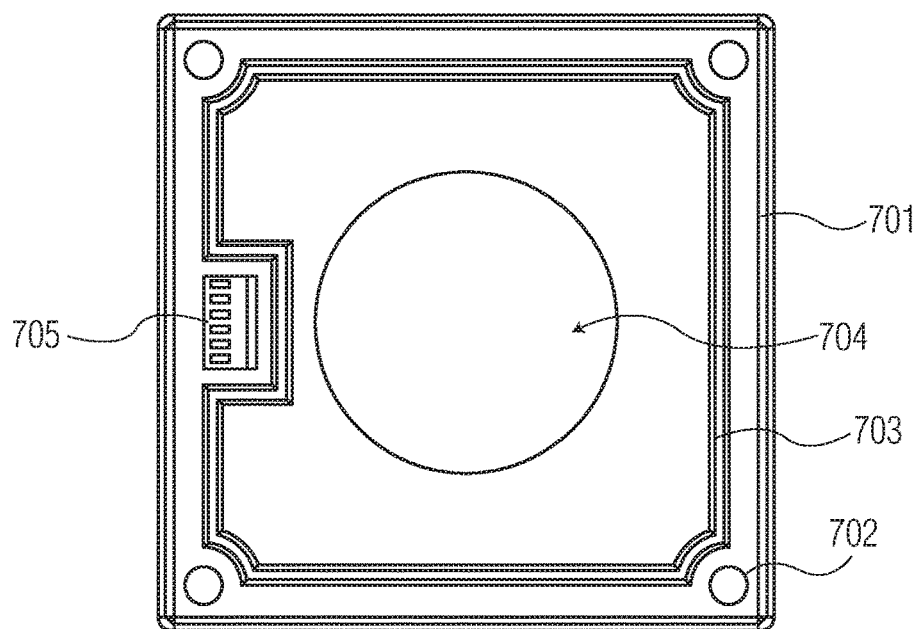
FIGS. 7-9 show a rear, side and perspective view, respectively, of a panel for attachment to a module according to the first embodiment.
Figure 8:
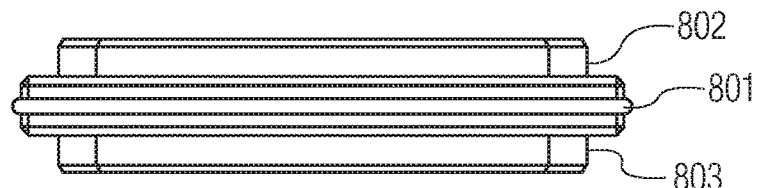
Figure 9:
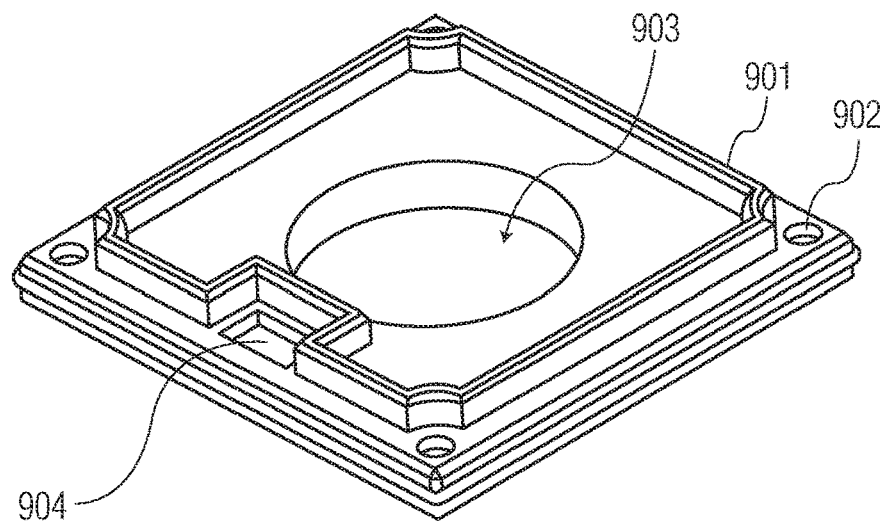

FIGS. 7, 8 and 9 show a top, side and perspective view of the interface panel 308 of the first embodiment. The interface panel 701, 801 has an aperture 704, 903 that permits wiring, sound, and the like to pass between modules. A ridge 802, 803, 901, that centers the interface panel within the two modules connected to it, by attraction of the corner magnets 702, 902. An electrical interface 705, 904 provides electrical connections between the modules.

Alternately, panels may be networked through a local Ethernet type system. For example, each panel may be provided with an RJ45 plug or 8P8C plug, to a corresponding jack attached to the exoskeleton or circuitry within. A Power over Ethernet (PoE) system may be used to power the panels, which according to IEEE 802.3at-2009 (PoE Plus), permits 25.5 W per port. In this case, each module comprises an Ethernet switch or router, with PoE functionality. It is noted that, if more power is required, a cable having more conductors may be used, a second RJ45 connector may be used, or a separate power source may be provided. In general, if four panels are each powered by 25 W, that results in a cube module capable of emitting 100 W, with higher peaks if a battery, capacitor or inductor is used to store power.

Within a four-inch form factor, such power density may be near the acceptable thermal power dissipation limits for consumer electronics.

According to another embodiment, a base module is provided with an Ethernet hub, and each panel or each module has a dedicated twisted pair or fiber optic path to the hub. For example, a 16 port 1 gigabit Ethernet hub is provided in a base unit connected to a power entry module receiving either AC main current, or power from an external power converter. The architecture, in this case, routes the data communications either directly from each module to the hub, or through modular connectors provided in each module leading back to the hub. Alternately, each module may include its own hub/switch/router.

According to another embodiment, the modules are interconnected using a Multimedia over Coax Alliance (MoCA) 2.0 compatible system. In this case, power is supplied independently. Each device accessing the network has a physical layer interface, and typically, this device is shared for an entire module. Because the physical layer is coaxial cable, the connector for each module may be a push-on coaxial connector. However, when connecting adjacent modules, a flexible coaxial cable may be provided, e.g., with a screw on connector, to permit versatility. As necessary, signal splitters, combiners, and amplifiers may be provided.

In some cases, a 75 Ohm shielded transmission line (e.g., a coaxial-type transmission structure) maybe molded or otherwise formed in the exoskeleton, obviating the need for free cables and connectors. Baluns may be used to pass the signal over twisted paid or shielded twisted pair.

One advantage of Ethernet class communications within the set of modules is simplified wireless communications according to WiFi standards, and simplified interconnection with the Internet. However, it is understood that the data communication protocols within a module or between modules need not be according to a particular standard.

In cases where a panel requires additional or different electrical connections, and auxiliary electrical connector, such as a card edge connector, pin connector, ribbon cable, or the like, may be used. For example, a driver module may utilize a 50 W amplifier, exceeding the normal specifications for the inter-module bus. The module in that case is connected to a power entry module that supports the higher power consumption, and indeed may encompass the high power amplifier itself. The driver is connected through an auxiliary electrical connection (separate from the digital communication bus in the exoskeleton) to the amplifier. For example, a circuit card may be provided within the endoskeleton, which connects to the panel. It is noted that the high power amplifier may be provided as an option, such that the same driver may be driven in a basic implementation from the exoskeleton bus, with a maximum power of e.g., 5 W, and with addition of an optional amplifier module and supporting power supply as may be necessary, in a high power mode with a maximum power of e.g., 50 W.

The system may be completely modular so that all different shapes and sizes easily attach to one-another allowing an individual, or many individuals together, to build a "sound-wall" or "video-wall" ever larger with the modular connections. Sizes and shapes include, but are not limited to, squares, rectangles, triangles, wedges, spheres, cylinders, hexagons, octagons, or pentagons. Any shape can house multiple drivers with all the associated touch and connection points.

Speaker housing units and options may also include the ability to control the positioning of a speaker driver within the housing without having to physically turn the speaker via, control components such as, for example, Micromotors, ultrasonic motors, electromechanical (MEMS) components or other such devices, acting alone or in combination. Accordingly, instead of requiring the physical movement of a speaker or series of speakers to achieve the desired product placement or direction in a room, control components may allow the control of the movement of the inner speaker module or multiple modules within any housing, or allow for the alignment of the different drivers such that all sub woofers face in a desired direction, while any or all midrange speakers are rotated in another direction, etc. Therefore, the system supports rotation of a module with respect to other modules, and control of direction of a driver within or upon a module. This allows the specific movement of any one specific speaker, or all speakers within the housing, in a multitude of directions via the software control, without physically moving the modules.

According to one embodiment, a directional speaker driver is provided on an articulated mount to the host module, connected to its amplifier through a ribbon cable. The articulated mount provides, for example, two angular axis of movement, controlled by a pair of motors, such as so-called pager motors. The control unit determines the presence of the particular speaker driver panel, including its identification number and capabilities. The controller performs an Internet lookup of the module, which permits authentication of the panel, and download of factory specifications and calibration data, for example. The Controller may also upload the entire system configuration and sensor (microphone) data mapping the environment to a cloud-based processor, which can then optimize the configuration of all modules, send commands to the control to obtain specific data required or recommended to optimize the configuration, or simply receive limited parameters which reduce the search space for the controller to optimize the configuration itself, including the angle of the speaker driver. Because of reflections within the room, sound deadening, etc., the controller may have to make further adjustments to speaker angle, equalization, echo cancellation and delay. Indeed, such changer may be appropriate as a listener moves within the environment, and for different sounds.

In some cases, a module, electrically compatible with other modules, is provided without itself being internally modular. For example, a horn speaker design may be folded within a cube, occupying the entire cube. Similarly, an acoustic suspension speaker design or a design with an active and passive radiator may benefit from sealing of the module and thus rendering the module unitary.

In some cases, a module may require a fan, for example where high average power dissipation occurs. Advantageously, acoustic control technologies and other technologies as disclosed in U.S. Pat. Nos. 7,974,714; 7,813,822; and 6,850,252, expressly incorporated herein by reference in their entirety, may be employed.

Embodiments of the modular quick connect system include user interface components for controlling the system. User interface design components may include hardware and software control components including, for example, touch-screen, speech recognition, gesture control, physical buttons, graphical user interfaces, web-based interfaces, keypad, or other such components for conveying user interaction. The user interface components may or may not be located on a remote device. Examples of remote devices include, but are not limited to, smartphones, tablets, computers, e-readers, stereos, or other such portable digital media. In other embodiments, the user interface components can be located on the module, or both the module and a remote device. Users may operate the user interface to further customize their sound experience via an application program, such as allowing multi-channel equalization, new sound patterns, specific speaker activation or sound output modifications, synchronization of sound. across multiple speakers or locations, voice activations, karaoke via synchronization of multi-party input, social media uploads or recordings, images, sounds, sharing, etc. Other control options include accessing functional elements on or in the system. The user interface may be projected from a video element located on the system, or viewed on an LCD or other monitor in, on, or around the housing, or via gesture or voice controls.

The controller is configured to allow the addition of one or more modular attachable elements such as added battery power, transducers, or amplifiers. The controller may have a rechargeable battery, for example a rechargeable cylindrical or prismatic Lithium-Ion polymer, with for example 600-5000 milliamps as a standard capacity, allowing for a certain number of hours of run-time. It should be noted that the techniques described herein may also be used with other types of batteries as well (e.g., NiCd, NiMH, etc.). The batteries and the controller may allow for quick charging and other like functions. Additionally, the controller may be configured to allow for additional add-on modular elements that may include additional power/battery modules allowing for extended, additional, or replacement power.

The controller may have updateable firmware and downloadable applications, allowing for the continued functional updates of capabilities, all controlled via the customized user interface accessible.

The controller also may act as a data collection, storage, memory, and reporting system, allowing for the collection of metadata from the user experience such as time, date, duration of use, songs, skips, drops, play frequency, ratings, for example to facilitate personalization of content, feedback or sales support.

In an illustrative embodiment, each speaker unit or any modular element therein, regardless of shape, allows for the flow of data, commands, communication, and power distribution both vertically and horizontally, so signals can flow to any one or all attached modular audio/video systems or controlled speakers, or any additional modules, connectors, or accessories.

On the face of each speaker configuration, the user may also find, in addition to the ability to customize and exchange grills, one or many accessory ports. These ports allow for the attachment of accessories such as lighting elements (e.g., LEDs), Displays (i.e. LCDs), GPS, FM/AM radios, MP3/digital audio players, cameras, projectors, etc., all managed by the controller and the control panel. The ports also may allow for the attachment of additional speakers, or modules, and allow for numerous product configurations. Additionally, the system may allow for the direct access to Internet programming, channels, content, via the cloud, WiFi, wireles sly, and channels for direct playback of content, some of which may be exclusively available to users of the system (i.e., private channels). The controller may support content protection and/or encryption/decryption, and preferably supports secure communication channels, especially outside of the system.

Each accessory and speaker element may be assigned its own identification number, which can be verified during an on-line registration process, which may be used to activate the component and/or new features of the component. Further, in a social environment where people share their components during a gathering, the identification of components can assist in retrieving one's own components.

The disclosed inventive concept is designed, in one aspect, to allow for the complete customization of your own listening experience without the limiting factor of purchasing off-the-shelf audio output devices. Realizing that experiences and listening taste may change over time, the system is modular and updateable, allowing for a lifetime of changes in speaker size, type, functionality, accessories, in conjunction with social engagement tools and smart controls.

Embodiments of the modular quick-connect audio/visual system can not only be stacked, configured, reconfigured, up-down-sideways, but also have complete customizable accessory elements that can be plugged in/out on multiple ports/points on each side of a unit. For example, a modular quick-connect audio/visual apparatus may include, as a customizable accessory element, a grill that would be customizable with colors, lights, initials, etc. Additionally, other embodiments include ports for the insertion of "Power Pills", or modular elements that can supply a variety of enhancements from added signal amplification, power, transducers, radiators, radios, antennas, connection points to power multiple units, etc. These Power Pills can also take the form of a stand, housing, bumpers, or feet that attach to or on the system, for example, either at the controller or control plate area. Additionally, this technology facilitates the shared music experience by allowing the multiple owners of the adaptable, modular audio/video systems to easily attach their respective systems together on the fly to create ever larger "walls of sound" with the built in connectivity functions, or for sharing contest across multiple platforms.

A control module may include, for example, a single or multicore CPU, random access memory, non-volatile memory graphic coprocessor, sensors (i.e., accelerometers, gyroscopes, magnetometers, proximity, rotation, thermometer, wind, humidity, etc.), communications interface (Ethernet, WiFi, Bluetooth), repeater/router/firewall functions, video interface (e.g., HDMI, DVI, etc.), infrared interface, NFC interface, cellular network interface (2G, 3G, 4G, LTE, LTE+LAA, Zigbee, ZWave, etc.), antenna(s), amplifiers, audio and analog interface, microphone or microphone array, power control and power interface, battery interface, inductive charging interface, trusted platform module, motor/actuator control, LED driver, touchscreen interface, noise cancellation circuitry, echo cancellation, POTS interface, VOIP support, SD/micro card reader, speakerphone, video/still camera, proximity sensor, fingerprint scanner, etc. In general, the electronics within the controller may comprise a superset of an advanced smartphone, such as the iPhone 6 or Samsung Galaxy S5, with at least all components and capabilities provided in such a device.

For example, the controller may include 128 GB of flash memory, have a 4.7-5.5 inch diagonal multitouch touchscreen display with 1920×1080 (FHD) pixel resolution, 500 cd/m2 max brightness, oleophobic coating on front of touchscreen, quad core ARM architecture processor running at 2.5-3 GHz, a graphics coprocessor, a sensor interface coprocessor, an 8-25 megapixel autofocus camera with 16× zoom and servo-controlled pan/tilt/zoom mount, optical image stabilization, LED flash, GPS, fingerprint sensor, UMTS/HSPA+/DC-HSDPA (850, 900, 1700/2100, 1900, 2100 MHz), GSM/EDGE (850, 900, 1800, 1900 MHz), LTE (Bands 1, 2, 3, 4, 5, 7, 8, 13, 17, 18, 19, 20, 25, 26, 28, 29), CDMA EV-DO Rev. A and Rev. B (800, 1700/2100, 1900, 2100 MHz), TD-SCDMA 1900 (F), 2000 (A), FDD-LTE (Bands 1, 2, 3, 4, 5, 7, 8, 13, 17, 18, 19, 20, 25, 26, 28, 29), TD-LTE (Bands 38, 39, 40, 41), 802.11a/b/g/n/ac/ad Wi-Fi, Bluetooth 4.0 wireless technology, NFC, Assisted GPS and GLONASS, Digital compass, H.264/H.265, Voice over LTE (VoLTE), Audio formats: AAC (8 to 320 Kbps), Protected AAC (from iTunes Store), HE-AAC, MP3 (8 to 320 Kbps), MP3 VBR, Audible (formats 2, 3, 4, Audible Enhanced Audio, AAX, and AAX+), Apple Lossless, AIFF, and WAV, Video formats: H.264 video up to 1080p, 60 frames per second, High Profile level 4.2 with AAC-LC audio up to 160 Kbps, 48 kHz, stereo audio in .m4v, .mp4, and .mov file formats; MPEG-4 video up to 2.5 Mbps, 640 by 480 pixels, 30 frames per second, Simple Profile with AAC-LC audio up to 160 Kbps per channel, 48 kHz, stereo audio in .m4v, .mp4, and .mov file formats; Motion JPEG (M-JPEG) up to 35 Mbps, 1280 by 720 pixels, 30 frames per second, audio in µlaw, PCM stereo audio in .avi file format, speech recognition, micro USB, HDMI, Lightening, Thunderbolt, 3.5-mm stereo headphone minijack, Built-in rechargeable lithium-ion battery, Barometer, Three-axis gyro, 3 axis-Accelerometer, Proximity sensor, Ambient light sensor, Zigbee (IEEE-801.15.4), Z-wave, UWB, and 1080P video projector.

According to one embodiment, a module provides an interface to a smart home and security system. In this capacity, it can arm and disarm the alarm and provide all control signals, display status of the system, provide monitoring of surveillance cameras, provide control over entries and lights (e.g., Z-wave devices), Temperature adjustment (HVAC, radiant heat, thermostat etc.), check monitors (who's home, where in home, 2-way communications), check phone messages, alert and emergency messages and notifications, control of appliances (oven, coffee machine, fridge etc.), garage door, control of music, control of TV and other entertainment system components (DVR, cable, etc.), open or close shades, monitor consumption (water, electric, gas), read sensor panels (flood, carbon monoxide, mold, allergens etc.), control/monitor sprinkler systems, proximity detection (on enter, on exit etc.), interface to robotic controls (Roomba, lawnmowers etc.), monitor/regulate solar panel systems, monitor well water level, monitor septic and oil tanks, emergency shutoff capabilities, garbage level monitoring, electronic clothing rack control, control air scrubbers based on allergen detectors, newspaper/mail/package tracking, gate control/access control, parental controls (TV, WiFi etc.), medical and health monitoring (monitored pill cases etc.), interface with smartwear for medical monitoring (heart rate, blood pressure etc.), connection to emergency services, drinking water monitoring, etc.

The controller may also provide an interface with smartwear and sports/fitness monitoring equipment, automotive/telematics equipment, GPS interface with schedule or with car, provide remote start for car (AC, defroster), OBDII interface, monitor car battery, monitor tire pressure, consumption monitoring and auto replenishment capabilities, set triggers (alarm clock etc.), external weather monitoring (temperature, snow accumulation etc.), storm warning and monitoring, general purpose computing, social networking, and communications, such as providing interface with email and schedule systems, interface with news/information/travel information sites, cell signal blocker/repeater, dangerous sound level monitoring, etc.

The system may provide various intelligent features, such as picking the most played songs off of registered users playlist local to their own music playback device such as their phone, within a specified geographic area, for playback on the "owner/controller' quick-connect system locally. A user may send play list requests to people at a location, and either give access to playlist, or give access to their own playlist for playback. A battle function is also provided, in which the speakers phase out according to who is singing/beat boxing, etc. There is an emphasis on that person's speaker rather than coming out of all of them. The controller may support Internet radio channels, and services, such as Spotify and Rhapsody. Similarly, video channels may be controlled and presented, such as Netflix, YouTube, Vimeo, and the like.

The system may further provide karaoke functionality, for single or multi users, which utilize the multichannel CSR capabilities. For example, thirty individuals may be invited on their phones in a location to sing together into applications on their phones, or via a link supplied by an owner/controller, and have all voices compiled tor playback on the quick-connect device with ability to play any one or all of the individual voice channels out loud, with ability to record the combined audio signal, ability to upload the signal, ability to apply sound effects to the signal, and an ability to record and redistribute to all participants the final recording. The system may also provide DJ Applications, for ways to use with the system to mix music with devices in different locations within a geographical area.

The system typically provides loudspeaker functionality, which permits overriding of normal audio playback with either real-time announcements, or to playback predetermined messages at specific times (preset). Modules separated from each other can provide conferencing/videoconferencing capabilities.

According to one embodiment, a baby monitor system is provided, which has audio and video monitoring of an infant, with the additional ability to adaptively play music (e.g., lullabies) based on the activity and noise level of the infant. A module in proximity to the infant communicates with a remote module in proximity to the parent, who can monitor and control the baby monitor.

The controller performs traditional audio control functions, such as source selection, equalization, output selection, volume control, etc. When a preferred soundscape is created, it may be saved as a favorite, and recalled by a custom label.

The controller may produce light patterns through controllable color LEDs, which may emit point source light or diffuse light, in a static or pulsating pattern. The light may be controlled based on acoustic patterns, visual patterns detected through a camera, or monitoring of a data stream.

The modules of the system may be used to provide an advertising unit, to attract customers. This can be used to create crowd share pop-up sales location for flash sales of product, accessories, and/or services. The modules may be provided to leave messages, content, recordings for a user at a geographic location. The modules may provide promotional channels for ad/product/discount space selling with possible mobile coupon within application for registered users.

Various embodiments of the invention have been described, each having a different combination of elements. The invention is not limited to the specific embodiments disclosed, and may include different combinations of the elements disclosed or omission of some elements and the equivalents of such structures.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention. Accordingly, it is intended that the invention not be limited to the specific illustrative embodiments, but be interpreted within the full spirit and scope of the appended claims and their equivalents and any description contained herein.

What is claimed is:

1. A system, comprising:
   a microphone array configured to produce an audio input signal from speech;
   an audio output port;
   a digital communication interface comprising a wireless network interface; and
   an automated digital processor, configured to:
   transmit data through the digital communication interface,
   receive data from the digital communication interface,
   receive the audio input signal from the microphone array,
   perform echo cancellation between the audio input signal and the audio output port,
   process the audio input signal to recognize speech representing a control signal, and
   selectively dependent on at least the control signal, perform a monitoring or control function selected from the group consisting of at least one of:
   (a) stream an audio program through the audio output port;
   (b) control an entertainment media system;
   (c) control a telephony system;
   (d) control a heating, ventilation and air conditioning system;
   (e) monitor an environmental sensor;
   (f) control a premises security and monitoring system;
   (g) control a personal safety system;
   (h) control a home appliance;
   (i) monitor utility consumption;
   (j) control a medical device;
   (k) monitor a patient;
   (l) interface with a robotic control; and
   (m) interface with an automobile communication bus.

2. The system according to claim 1, wherein the monitoring or control function controls an external device, dependent on the command and the received data.

3. The system according to claim 1, further comprising at least one loudspeaker configured to receive and produce the audio program.

4. The system according to claim 1, further comprising an enclosure for the microphone array, at least one loudspeaker, the digital communication interface, and the automated digital processor.

5. The system according to claim 1, further comprising a memory, configured to store at least one audio output control parameter, wherein the automated digital processor selectively controls the audio output signal processing in dependence on the audio output control parameter.

6. The system according to claim 1, further comprising an imaging sensor, wherein the automated digital processor is further configured to receive, process, and communicate an image from the imaging sensor.

7. The system according to claim 1, further comprising a display, configured to present graphic images to a user.

8. The system according to claim 1, wherein the imaging display comprises a touchscreen.

9. The system according to claim 1, wherein the audio output port comprises an HDMI port.

10. The system according to claim 1, wherein the audio output port comprises a 3.5-mm stereo headphone minijack.

11. The system according to claim 1, further comprising a wireless Zigbee interface, wherein the at least one digital processor is further configured to control an external device through the wireless Zigbee interface.

12. The system according to claim 1, wherein the at least one digital processor is further configured to communicate with a remote server through the digital communication interface, to receive content for reproduction through the audio output port.

13. The system according to claim 1, wherein the at least one digital processor is further configured to communicate with a distributed and decentralized system through the digital communication interface.

14. The system according to claim 1, wherein the at least one digital processor is further configured to provide distributed and decentralized identification and authentication through the digital communication interface.

15. The system according to claim 1, wherein the at least one digital processor is further configured to coordinate with other corresponding systems through the digital communication interface.

16. The system according to claim 1, wherein the automated digital processor is further configured to communicate through the digital communication interface with a remote cloud-based processor through the Internet.

17. The system according to claim 1, wherein the automated digital processor is configured to perform the monitoring or control function selected from the group consisting of at least one of: control the heating, ventilation and air conditioning system; monitor the environmental sensor; and control the premises security and monitoring system.

18. A method for processing a command, comprising:
providing a microphone array configured to produce an audio input signal from speech;
bidirectionally communicating through a digital communication interface comprising a wireless network interface;
receiving the audio input signal from the microphone array;
performing echo cancellation between the audio input signal and an audio output port;
processing the audio input signal to recognize speech as a control signal;
monitoring or controlling a system selectively dependent on at least the control signal, to at least one of:
(a) stream an audio program through the audio output port;
(b) control an entertainment media system;
(c) control a telephony system;
(d) control a heating, ventilation and air conditioning system;
(e) monitor an environmental sensor;
(f) control a premises security and monitoring system;
(g) control a personal safety system;
(h) control a home appliance;
(i) monitor utility consumption;
(j) control a medical device;
(k) monitor a patient;
(l) interface with a robotic control; and
(m) interface with an automobile communication bus.

19. A system, comprising:
a microphone producing an audio input signal;
a digital communication interface;
a speaker responsive to an audio output signal; and
a microprocessor, configured to:
communicate through the digital communication interface;
perform echo cancellation between the audio input signal from the microphone and the audio output signal to the speaker;
recognize a voice control signal in the audio input signal from the microphone; and
control a heating, ventilation and air conditioning system dependent on the voice control signal, data communicated through the digital communication interface, and determined usage habits of a user.

20. The system according to claim 19, further comprising a touchscreen, wherein the microphone comprises a microphone array, the digital communication interface comprises a wireless digital communication network interface, and wherein the microprocessor is further configured to respond to a touch on the touchscreen and to control the heating, ventilation and air conditioning system further dependent on the touch on the touchscreen.

\* \* \* \* \*